United States Patent [19]
Murphy, Jr. et al.

[11] Patent Number: 5,481,707

[45] Date of Patent: Jan. 2, 1996

[54] DEDICATED PROCESSOR FOR TASK I/O AND MEMORY MANAGEMENT

[75] Inventors: Philip A. Murphy, Jr., King of Prussia; Wayne A. Genetti, Phoenixville; Gunnar K. Gunnarsson, West Chester; Edward J. Pullin, Norwood; Steven A. Thompson, Coatesville; Robert H. Tickner, Jeffersonville; Gary C-F Wu, Audubon, all of Pa.

[73] Assignee: Unisys Corporation, Blue Bell, Pa.

[21] Appl. No.: 420,329

[22] Filed: Apr. 11, 1995

Related U.S. Application Data

[63] Continuation of Ser. No. 187,796, Jan. 26, 1994, abandoned, which is a continuation of Ser. No. 698,588, May 19, 1991, abandoned.

[51] Int. Cl.$^6$ .............................. G06F 3/00; G06F 12/06; G06F 13/20; G06F 15/16
[52] U.S. Cl. .................. 395/650; 395/821; 395/427; 395/800; 364/230; 364/230.3; 364/283.3; 364/283.4; 364/245.6; 364/DIG. 1; 364/964.4; 364/967.1; 364/DIG. 11
[58] Field of Search ............................ 395/275, 425, 395/800, 650, 700

[56] References Cited

U.S. PATENT DOCUMENTS

| | | | |
|---|---|---|---|
| 4,074,352 | 2/1978 | Cook et al. | 364/200 |
| 4,228,496 | 10/1980 | Katzman et al. | 395/200 |
| 4,356,550 | 10/1982 | Katzman et al. | 395/575 |
| 4,374,413 | 2/1983 | Comfort et al. | 395/725 |
| 4,374,414 | 2/1983 | Comfort et al. | 395/725 |
| 4,376,975 | 3/1983 | Comfort et al. | 395/725 |
| 4,453,216 | 6/1984 | Chiba et al. | 395/425 |
| 4,454,575 | 6/1984 | Bushaw et al. | 395/275 |
| 4,564,899 | 1/1986 | Holly et al. | 364/200 |
| 4,569,062 | 2/1986 | Dellande et al. | 375/370 |
| 4,597,054 | 6/1986 | Lockwood et al. | 395/725 |
| 4,615,017 | 9/1986 | Finlay et al. | 395/325 |
| 4,633,434 | 12/1986 | Scheuneman | 395/550 |
| 4,649,475 | 3/1987 | Scheuneman | 395/425 |
| 4,652,993 | 3/1987 | Scheuneman et al. | 395/425 |
| 4,703,268 | 3/1988 | Gyngell et al. | 324/309 |
| 4,745,302 | 5/1988 | Hanawa et al. | 327/160 |
| 4,779,089 | 10/1988 | Theus | 395/825.5 |
| 4,803,622 | 2/1989 | Bain, Jr. et al. | 395/275 |
| 4,812,968 | 3/1989 | Poole | 395/275 |
| 4,813,011 | 3/1989 | Kulakowski et al. | 395/275 |

OTHER PUBLICATIONS

"Operating Systems" by H. M. Deitel, 1990, p. 57.
Computer Architecture and Organization by John P. Hayes, pp. 525–533, 1988, etc.

*Primary Examiner*—Alvin E. Oberley
*Assistant Examiner*—Michael T. Richey
*Attorney, Agent, or Firm*—Ratner & Prestia

[57] ABSTRACT

A computer system performs memory to memory transfer, task scheduling and I/O request handling via a group of dedicated processors (e.g. a memory interface unit, an I/O unit, a data transfer unit, and a task control unit). The memory interface unit facilitates data interaction between the memory and the remainder of the system. The I/O unit is coupled to the memory interface unit and performs high level I/O job functions including I/O job scheduling, I/O job path selection, gathering of job statistics and device management. The data transfer unit is coupled to the memory interface unit and moves data between memory locations. The task control unit, coupled to the memory interface unit, allocates and deallocates events, maintains the status of tasks running on the system and schedules the execution of tasks. A hierarchical error reporting scheme is used by all of the processors.

16 Claims, 15 Drawing Sheets

| OPERATION | WE's | DATA |
|---|---|---|
| WWE | 1111111 | ———————————— |
| WWE | 1111111 | ———————————— |
| WWE,WPW | 1110000 | ———————   05  17  91  A2 |
| WFW | 0000000 | —   3  3B  07  49  12  82  AD |
| SPP(CW) | | |
| WFW | 0000000 | —   3  57  C8  42  17  61  62 |
| WFW | 0000000 | —   3  36  4A  ...... |
| WFW | 0000000 | ............ |
| WFW | 0000000 | ............ |
| SFP(CW) | | |
| WFW | 0000000 | ........ |
| WFW | 0000000 | ........ |
| WFW | 0000000 | ............ |
| WFW | 0000000 | —   3  D1  17  31  1C  28  E5 |
| SFP(CW) | | |

| | | |
|---|---|---|
| WFW | 0000000 | —   3  E7  91  37  6B  22  1E |
| WWE,WPW | 0000011 | —   3  01  AB  31  4B ————  |
| WWE | 1111111 | ———————————— |
| WWE | 1111111 | ———————————— |
| SPP(CW) | | |

DEDICATED PROCESSOR FOR TASK I/O AND MEMORY MANAGEMENT

This application is a continuation of application Ser. No. 08/187,796 filed Jan. 26, 1994, which is a continuation of Ser. No. 07/698,588, filed May 10, 1991 (abandoned).

FIELD OF THE INVENTION

This invention is in the field of multiprocessor computer systems. In particular, a computer system is disclosed in which a plurality of processors each control predetermined system functions and transfer data among I/O devices, memory and a main processor.

TABLE OF CONTENTS

Background of the Invention
Summary of the Invention
Brief Description of the Figures
Detailed Description
  A. Overview
  B. I/O Controller
    1. System Organization
    2. CSBus Interface
    3. Message Handling
    4. Sequencer
  C. I/O Module Requestors
  D. Memory Interface Unit
    1. System Organization
    2. Write Enable Storage Logic Operation
    3. Memory Storage
    4. Merge Function
  E. I/O Module Requestors
    1. Task Control Unit
    2. I/O Unit
    3. Channel Manager Unit
    4. Data Transfer Unit
  F. Error Handling
    1. Overview
    2. IOU and TCU Error Reporting
    3. CMU and DTU Error Reporting
    4. MIU Error Reporting

BACKGROUND OF THE INVENTION

Most computer systems made to this day are of the conventional von Neumann organization which has remained relatively unstructured with the objective of being "general purpose." However, over the past two decades, better understanding has been achieved in the exploitation of the potential of block-structured programming languages that represent complex algorithms. Block structuring of algorithms, i.e., nested declarations, is a natural form for the expression of such complex algorithms.

A particular computer system that was designed to employ block structuring of algorithms, or nested languages (and also nested data structures), is described in the Barton, et al., U.S. Pat. Nos. 3,461,434; 3,546,677 and 3,548,384. These patents describe a stack-oriented data processor where the stack mechanism, a first-in last-out mechanism, handles the flow of operators and associated parameters in a manner which reflects the nested structure of particular higher level languages that are designed to handle natural forms for the expression of complex algorithms. Such languages include ALGOL and ALGOL type languages, such as PL/1, C, and so forth, which are based on the block-structuring of algorithms, i.e., nested declarations. While this may appear to impose unnecessary constraints on system development, the resulting products, measured in terms of throughput and flexibility, suggest that design "constraints" may really have been design opportunities (Cf., E. I. Organick, Computer System Organization, Academic Press 1973).

A system of the type described in the above-identified Barton patents is oriented around the concept of a segmented memory and specially treated segments called stacks. The processor runs in an expression stack; operators take their arguments from the top of the stack and leave their results on the top of the stack. The data addressing space of the executing program (task) is mapped into the stack as well as other stacks linked to it and data items referenced by describers contained in the stack structure.

While the primary function of such computer systems is to perform data processing, such processing is accompanied by a variety of system operations. Through the cooperation of the various components within the computer system (including a central processing unit (CPU), a memory, and one or more I/O devices) a variety of system operations are performed. These system operations include memory to memory transfer, task scheduling and I/O request handling.

Memory to memory transfer relates to the movement of data between various memory locations. These transfers may be combined with data modification operations. In performing memory to memory transfers, a variety of operations are invoked. These include the buffering of addresses for storage and fetching, translation between logical and physical addresses, arbitration and control of memory requests, masking for byte level modification, and maintenance of parity to ensure error-free data transfer.

Task scheduling relates to the order in which various functions are performed by the computer system. Certain tasks are given predetermined intervals during which they must complete (also known as a time-slice). Other tasks are prioritized so that they may be completed before lower priority tasks are handled. Tasks may be initiated by user requests or by the operating system.

I/O request handling relates to the control necessary to ensure that requests are issued to the appropriate I/O devices, I/O operations are performed as desired, and I/O data which is returned as a result of an I/O operation is transmitted to the process which initiated the I/O request. In addition, various statistics are maintained concerning the progress and completion of I/O operations.

The performance of all of the operations described above places a major burden on the central processing unit. Although the basic objective of many computer systems is to perform data processing, the necessity for performing a variety of support functions to support data processing may significantly retard system response.

Prior art computer systems have sought to improve throughput through the use of a multiprocessor system. In such a system, several processors share data processing functions. By increasing the number of processors in a computer system, the prior art sought to develop a computer system which processed more data in a shorter period of time. Another approach taken by prior art computer systems was to use multiple dedicated processors, each programmed to perform a specific system operation.

While the prior art achieved an increase in system throughput, various disadvantages exist.

For example, while a plurality of processors have been introduced to computer systems to facilitate these operations, the failure of one processor in such a system may lead to a complete disruption of system operation.

Prior art systems suffered from a lack of modularity. Thus, unique system components needed to be designed specifically to perform predetermined functions.

Many prior art systems suffered from a severe lack of reliability. If one device failed within the system, system functions could not be transferred to another otherwise equivalent device within the system.

As the number of processors in a computer system has increased, more sophisticated error handling mechanisms have been required for efficient system operation. In addition, various processors have differing error handling needs. The prior art suffered from insufficient error handling capabilities for multiprocessor environments.

U.S. Pat. No. 4,454,575 issued to Bushaw et al. discloses a time-shared memory device which is controlled by a central processor unit. Although data processing is performed by peripheral devices, this reference discloses a system in which the peripheral devices are hardwired to perform unique I/O functions. There is no facility that allows expeditious data handling independent of the data processing task of the data processing system.

U.S. Pat. Nos. 4,228,496 and 4,356,550 to Katzman et al. disclose multiprocessor systems in which a plurality of processing modules can communicate with each other through a bus network. The multiprocessor system includes an input/output (I/O) system having multi-port device controllers and (I/O) buses connecting each device controller for access by the (I/O) channels in at least two different processor modules.

SUMMARY OF THE INVENTION

The present invention is in the context of an I/O system which performs memory to memory transfer, task scheduling and I/O request handling. A memory interface unit facilitates data interaction between the memory and the I/O system. An I/O unit (IOU) is coupled to the memory interface unit and performs high level I/O job functions including I/O job scheduling, I/O job path selection, gathering of job statistics and device management. A Data Transfer Unit (DTU) is coupled to the memory interface unit and moves data between memory locations. A Channel Manager Unit (CMU) manages data movement between the main memory and peripheral devices. A Task Control Unit (TCU) is coupled to the memory interface unit. This unit allocates and deallocates events, maintains the status of tasks running on the system and schedules the execution of tasks. The IOU, DTU, CMU and TCU are each implemented with a substantially similar computer circuit. Each computer circuit is implemented with an identical microsequencer chip. A hierarchical error reporting scheme is used by all components of the system. An operating system routine can be invoked to handle hardware initiated requests (such as error reporting).

DETAILED DESCRIPTION

A. Overview

The present invention provides facilities which are associated with the I/O and CPU management and data transfer functions of a mainframe computer. These functions are provided with a high degree of modularity for simplified installation and connectivity. This modularity, particularly in the hardware design, allows for improved program, maintenance and debugging ease. A restart command is always recognized and processed, even after a fatal error is encountered. An interrupt driven protocol is disclosed which allows up to four types of interrupts to be recognized. A hierarchical memory bus interface is included to allow interaction with up to three memories over a single bus. Data is buffered to allow for simplified channel interfacing. A purgeless cache interface is also provided.

Figure 1:
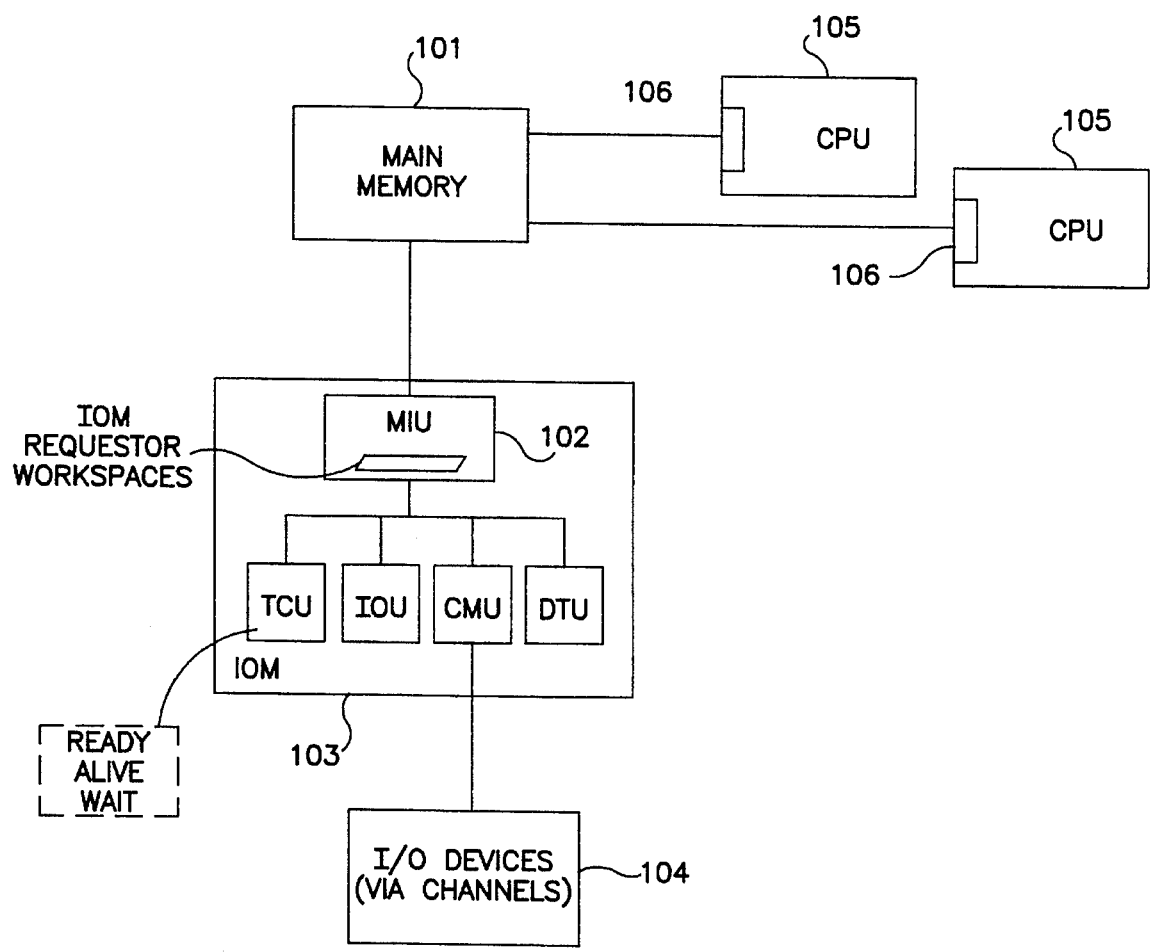
FIG. 1 is a block diagram of a computer system which may include an embodiment of the disclosed invention.

FIG. 1 shows the overall computer system architecture. A group of I/O devices 104 facilitate storage and retrieval of information in the memory 101 as required by programs running on the CPUs 105. I/O operations are coordinated by a plurality of I/O module requestors which are found in an I/O module 103. The I/O module requestors communicate with the memory 101 through the memory interface unit 102. The memory 101 includes disk cache and user buffer space.

The plurality of CPUs 105 each include a cache memory 106. Each CPU 105 is able to communicate directly with the main memory 101 via this cache memory.

Each exemplary cache memory 106 is a purgeless cache. Interaction with the main memory is done through a purgeless cache protocol. Data values are stored in the cache memory 106 in four-word sets and the status of any four-word set is held in the main memory. Thus, if a first processor fetches a four-word set from memory and intends to modify the data in the set, the cache status entry for the data in the main memory 101 indicates that the data in the set is held by the first processor exclusively. Any attempt by, for example, a second processor to access the data in main memory will be unsuccessful until the modified data has been written back into the main memory 101 by the first processor.

Alternatively, the first processor may request data from memory which will not be modified. In this instance, the cache status entry for the four-word set indicates that the first processor has the data in a shared state. The second processor may also access shared data but may not gain exclusive access to the data until the set has been invalidated in the first processor's cache.

Figure 2:
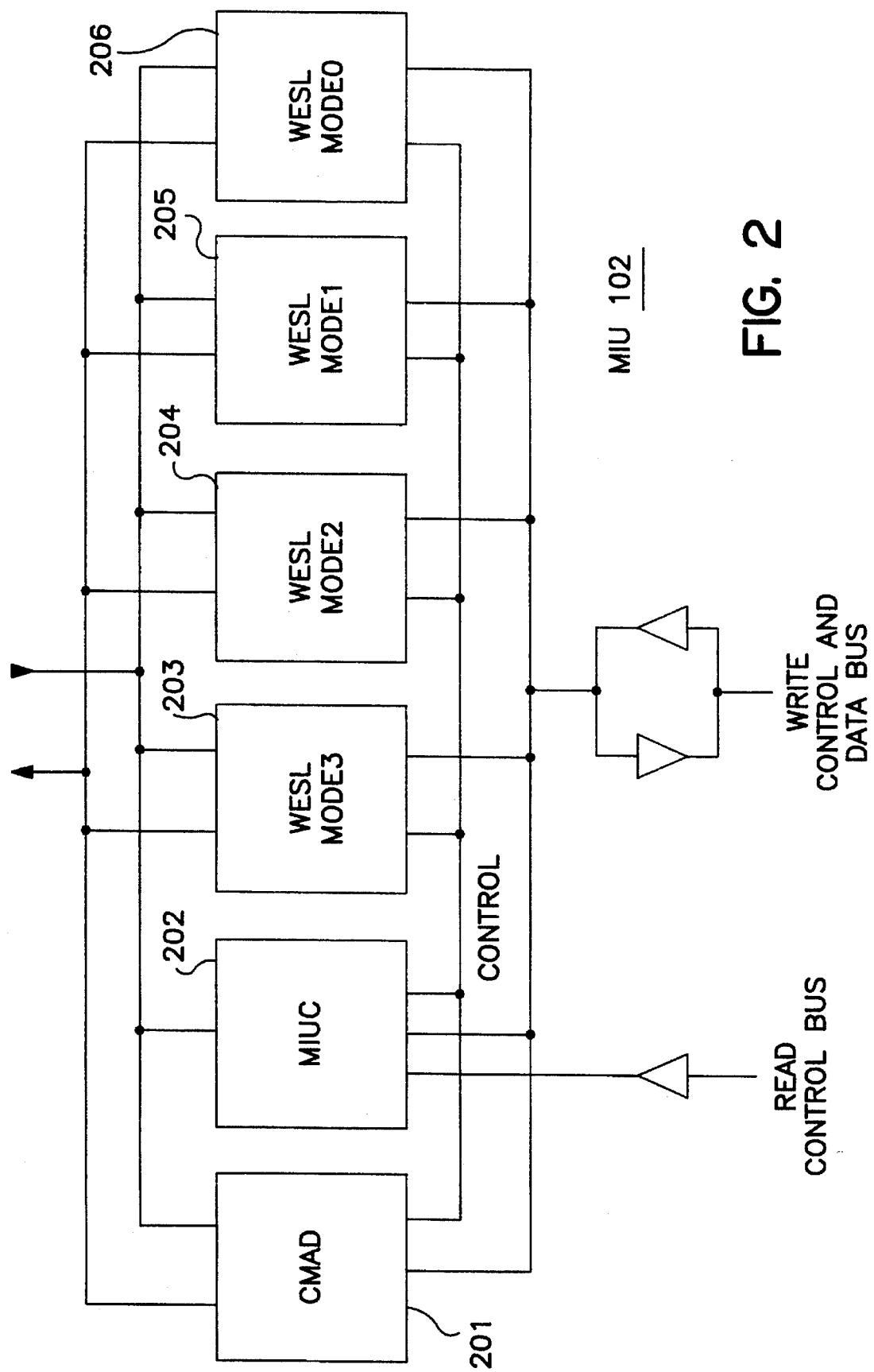
FIG. 2 is a block diagram of the memory interface unit (MIU) shown in FIG. 1.

FIG. 2 shows a block diagram of the memory interface unit 102. The MIU 102 communicates with the memory using the same purgeless cache protocol which is used by the cache memories. The MIU 102, however, does not include a cache memory. In this configuration, a common memory interface is achieved among the CPUs 105 and the I/O requestors in the IOM 103. When an IOM requestor attempts to perform a store operation to the main memory, the MIU requests original data from the main memory for successive data manipulation. This data is transferred to the MIU, where it is modified or replaced, and immediately returned to the main memory. Details of this procedure are discussed below.

The MIU is capable of performing byte level modifications (i.e. the modification of individual bytes within a page of memory). The byte level modification feature enables individual byte modification without tying up valuable system resources, such as the IOM requestor. Without the byte level modification feature, it may be necessary for data from the memory to be placed in a register external to the memory, manipulated through an ALU, returned to the register external to the memory and transferred back to the memory. For an exemplary byte level modification using the exemplary embodiment of the invention, an I/O module (IOM) requestor sets up four words of data in the MIU's data buffer and independently sets up four words of a byte-level write enable mask corresponding to those four data words. The requestor then signals the MIU to perform the byte level modification in which data provided by an I/O device is merged into data from the memory 101.

The I/O module (IOM) 103 includes a plurality of IOM requestors which provide I/O job management, CPU management and perform host I/O data transfer. The board design is extremely modular to reduce costs and to facilitate interaction with the MIU. In the exemplary embodiment of the invention, each IOM requestor is a substantially similar computer circuit which is physically realized with a hardware device known as an I/O controller (IOCT) and peripheral hardware (i.e. drivers, receivers, memory, etc.).

An IOCT is a small programmable processor. Each IOCT contains an ALU, registers and a barrel shifter, a small scratch pad memory, as well as a microcode sequencer, a bus interface and an interrupt controller.

Figure 4A:
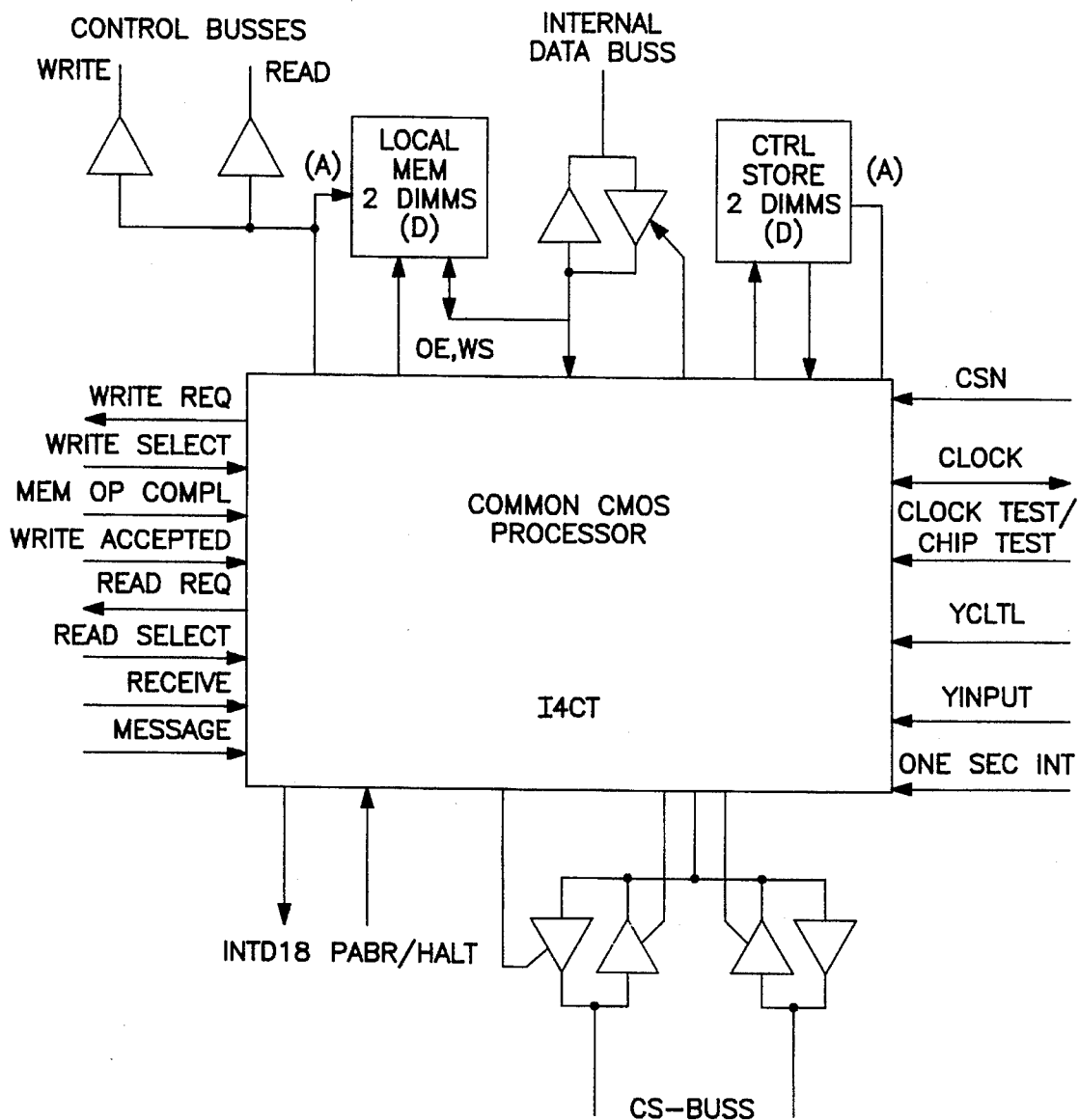
FIG. 4a is a block diagram of an Input/Output Controller (IOCT) which may be configured as a Data Transfer Unit (DTU), Input/Output Unit (IOU) or Task Control Unit (TCU) shown in FIG. 1.
Figure 4B:
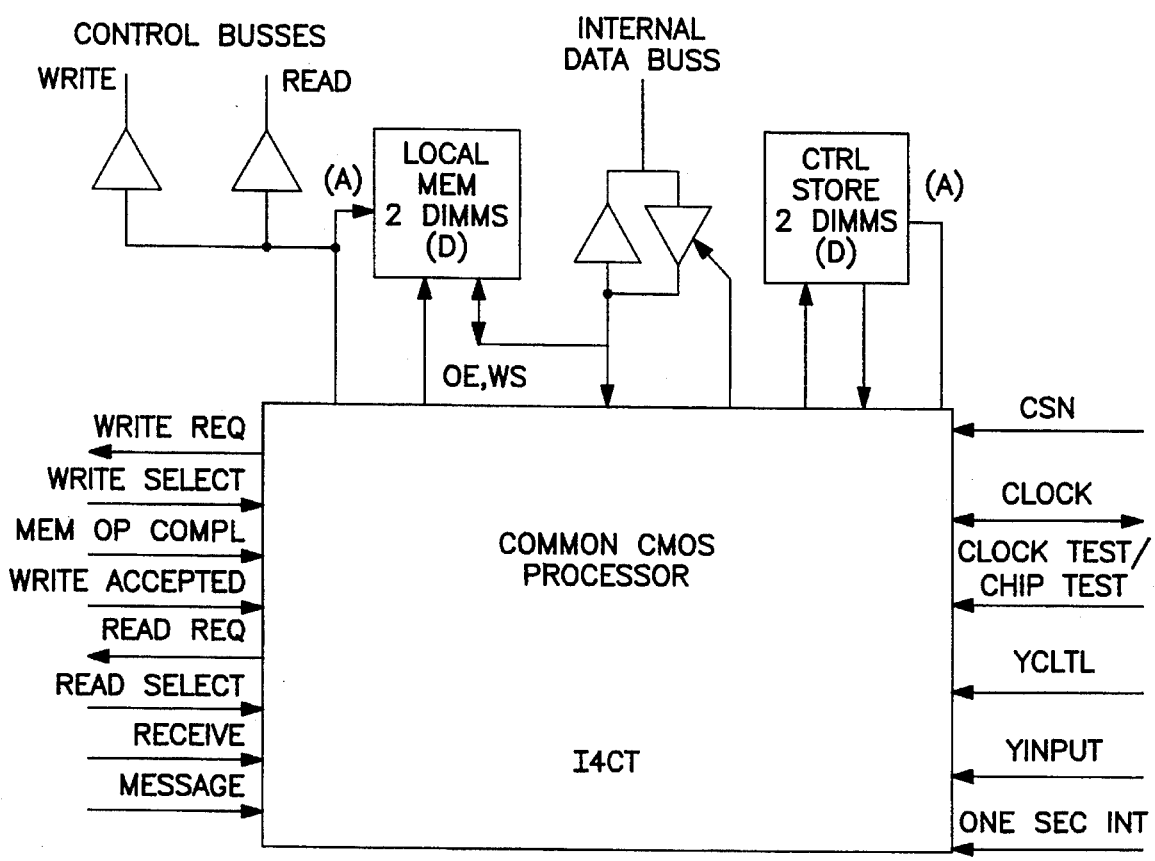
FIG. 4b is a block diagram of an IOCT configured as one of the Channel Management Units (CMU) shown in FIG. 1.

Each IOCT is initialized with different firmware. This configures the IOCT into one of four different types of IOM requestors: a Task Control Unit (TCU), an I/O Unit (IOU), a Data Transfer Unit (DTU) or a Channel Management Unit (CMU). An IOCT, configured as either an IOU, DTU, or TCU is shown in FIG. 4a. An IOCT configured as a CMU is shown in FIG. 4b.

B. I/O Controller (IOCT)

1. System Organization

Figure 5A:
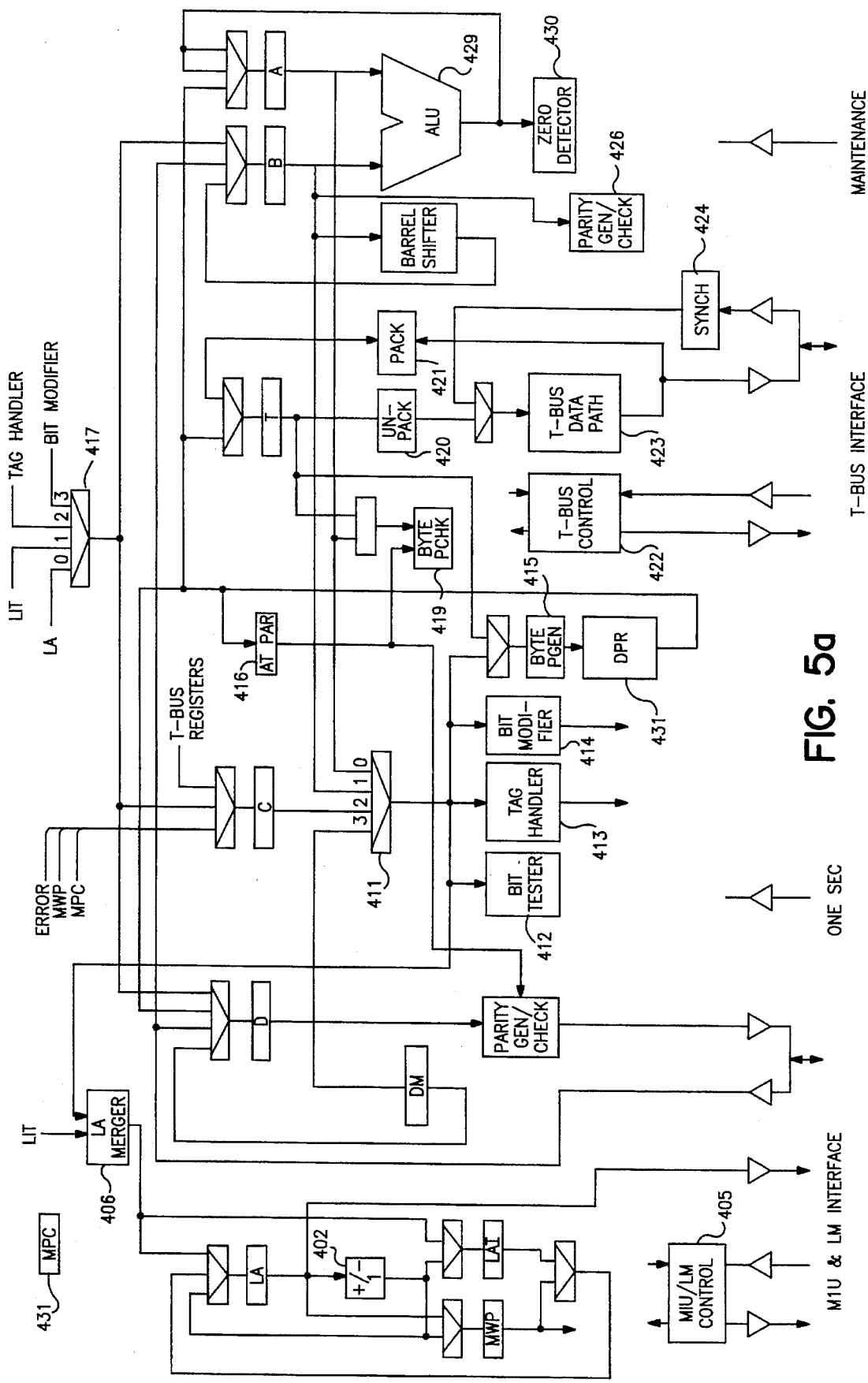
FIG. 5a is a low level block diagram of the ALU and register portion of the IOCT.

As previously stated, the IOCT is a small programmable processor. In a preferred embodiment of the present invention, the IOCT is implemented on a single chip. Thus, a plurality of IOCTs can be implemented on a single circuit board. A low level block diagram of the IOCT is shown in FIG. 5a. The addressing logic is shown on the left side of the figure. A local memory address register (LA) is used for storing the address of data to be accessed. An automatic increment/automatic decrement provision is provided to facilitate transfers of blocks of data. A local memory address/interrupt register (LAI) stores the current local memory address during an interrupt so processing from that address can resume when service of the interrupt has reached completion. A message write pointer (MWP) is used as part of the message handling capability, described below.

As can be seen throughout the figure, a group of registers is provided (A, B, T, ATPAR, C, D). The B and D registers are able to be loaded with data directly from memory. However, to perform double-operand arithmetic operations, two operands are loaded into registers B and A. Thus, the first operand is loaded into register B and, through a no-operation (NO-OP) command on the ALU, is transferred to register A as the second operand is loaded into register B. The result can be stored in register A.

The T and C registers are used for scratch pads. A multiplexer 411 allows for specialized functions to be performed on specific data. For example, bit tester 412 allows an individual bit to be easily examined without having to perform a mask-and-branch test within the ALU. Bit tester 412 may also be used for branch control. Tag handler 413 allows for a tag field to be appended to a word of data. Tag fields are used to differentiate memory words by function (e.g. data or program) or by type (e.g., double precision or single precision). The bit modifier 414 allows for a single bit within a word to be modified without USING the OR function within the ALU. The BYTE PGEN block 415 is used for generating parity for data to be stored in the dual port RAM (DPR) 431 of the IOCT.

2. Channel Service Bus Interface

Each IOCT also includes a Channel Service Bus interface 432. The Channel Service Bus is a bus which interfaces with a variety of different channel types (MLI, IPI, SCSI, etc). Data enters the IOCT through a synchronizer. The synchronizer synchronizes the incoming data stream with the IOCT internal clock rate. As the synchronized data stream enters the IOCT the data is packed together to form a memory word having 48 bits and a four bit tag field. Then, through the T register, the data is fed into the dual port RAM. Once sufficient data is available in the RAM, the IOCT sequencer begins to transfer its contents, one word at a time, to the MIU, for subsequent storage to the memory 101.

3. Message Handling

The IOCT also accepts messages, i.e., requests for service from the CPU or from another IOM requestor. A request for service may include, for example, a memory write request. Thus, the local memory accompanying the IOCT may be used as a message buffer. Memory addresses within the local memory range from 0–3FFF hexadecimal. Addresses 3E00–3FFF are reserved for the message buffer. When an IOCT is to receive a message, the MIU transmits a plurality of control signals which temporarily stops sequencer execution. In addition, the local memory address register LA and the message write pointer register (MWP) 403 are swapped. The MIU then supplies four message words consecutively, instructing the IOCT to write each message word to its local memory and to increment LA. After the fourth word has been supplied by the MIU and written to local memory by the IOCT, registers LA (now pointing to the next four word page of the message buffer) and MWP 403 are swapped back. Finally, the message page counter register (MPC) 431 is incremented, informing the IOCT that a new message exists. The MIU then releases the IOCT's sequencer to resume processing.

When possible, the IOCT will be interrupted by the MPC 431 when the contents of the MPC 431 are not equal to zero. The IOCT will enter an interrupt service routine which will read and process the new message. The MPC 431 will then be decremented.

4. Sequencer

Figure 5B:
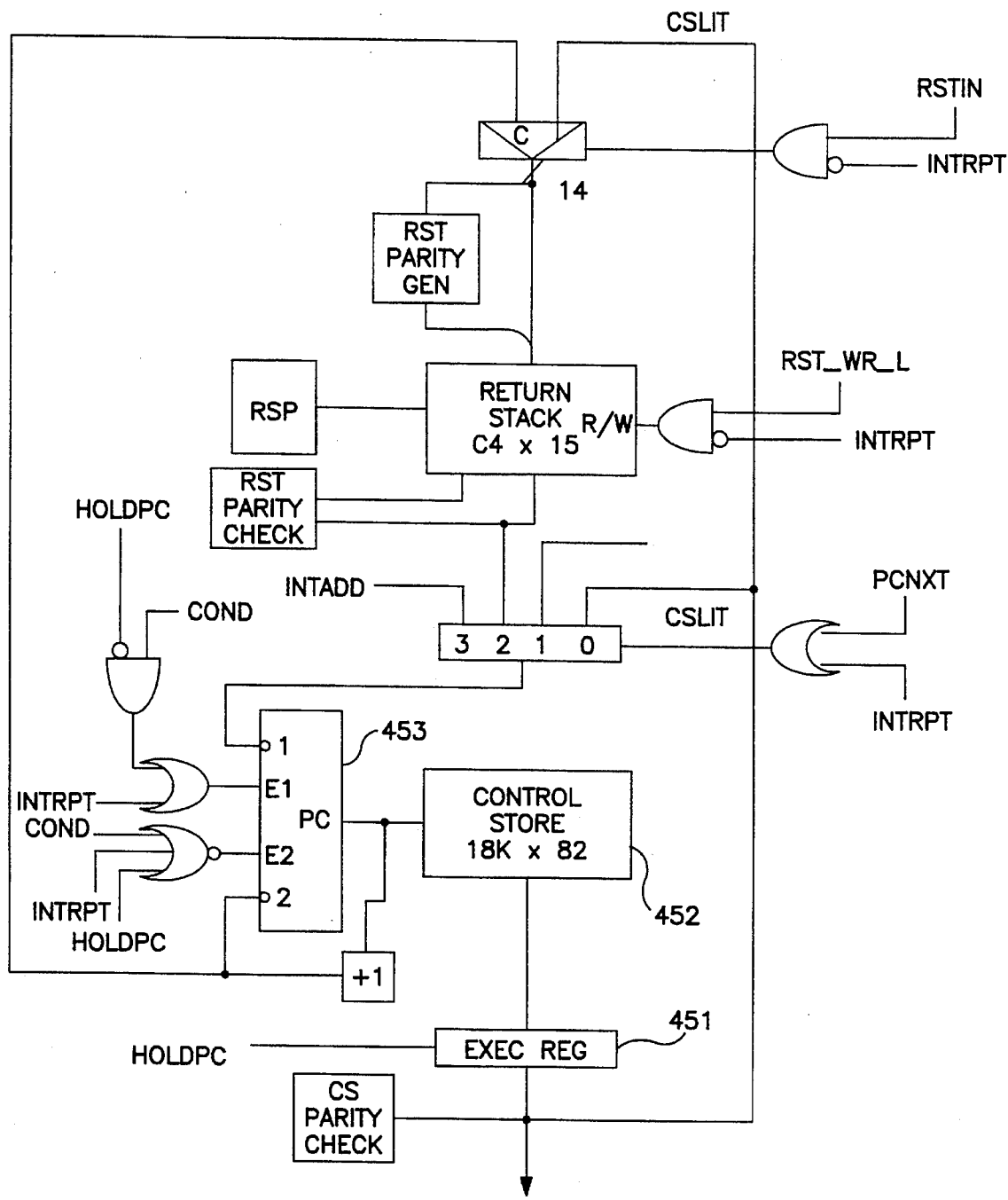
FIG. 5b is a low level block diagram of the IOCT microcode sequencer.

FIG. 5b shows the microsequencer for the IOCT. This sequencer follows the basic principles of operation of a microsequence controller. These principles of operation are discussed in Design of Digital Computers, H. W. Gschwind, Springer-Verlag New York 1967 on p. 379–387 herein incorporated by reference for its teachings in the field of microsequence controllers. The sequencer is used for controlling and coordinating the functioning of devices within the IOCT. These functions are performed as a result of a bit pattern which is loaded into the execution register 451. A sequence of such bit patterns allows the IOCT to perform a variety of predetermined functions. This pattern sequence is referred to as microcode. The microcode for the sequencer is stored within the control store memory 452. The program counter (PC) 453 may be modified as a result of interrupts appearing on the interrupt lines and particular bit configurations resulting from signals from the bit tester which appear on the COND line. These PC modifications implement a branching function for the microsequencer.

C. I/O Module Requestors

Figure 8:
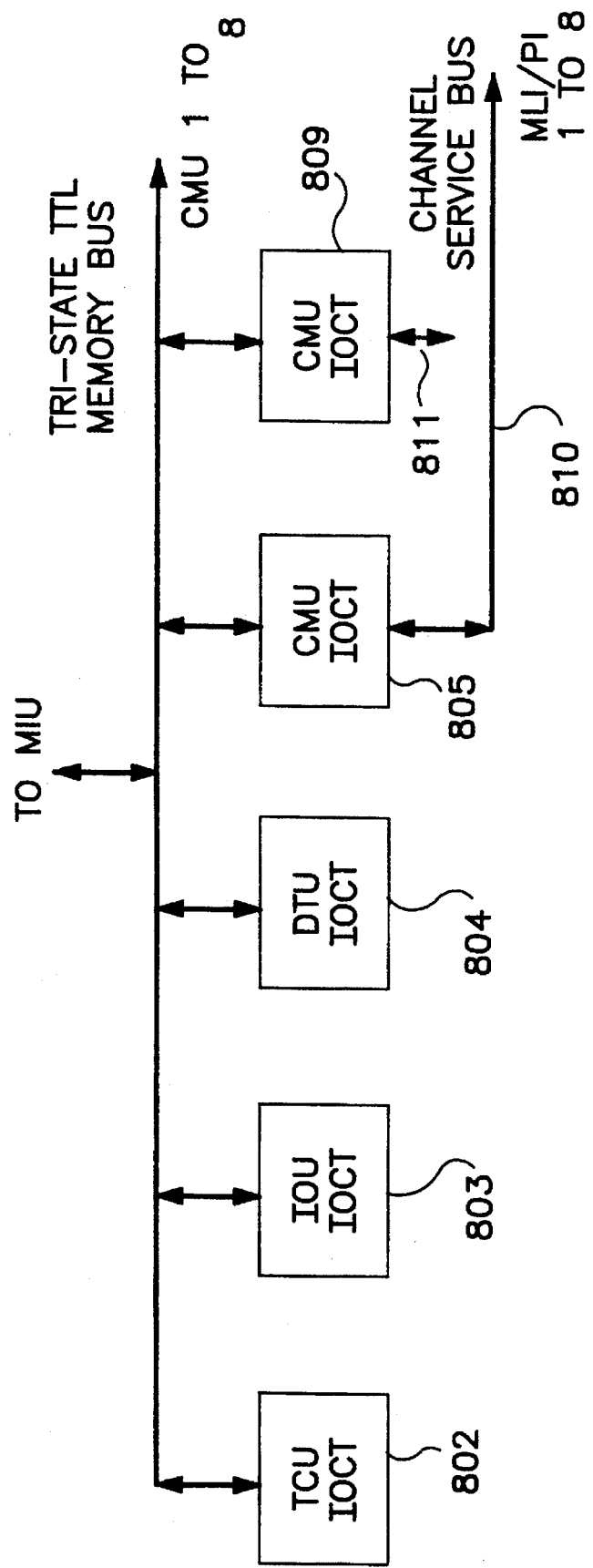
FIG. 8 is a low level block diagram of the Input/Output Module (IOM) unit shown in FIG. 1.

FIG. 8 is a high level block diagram of the I/O module (IOM) requestors. Each component is discussed below.

The I/O unit (IOU) 803 performs high level I/O functions such as the scheduling of I/O jobs, the selection of data paths over which I/O jobs are performed, the gathering of job statistics and the management of I/O devices and a hardware disk cache.

The data transfer unit (DTU) 804 performs block data transfers from one location in memory to another upon the request of the IOU 803. In a preferred embodiment of the present invention, the DTU is used for disk caching, as discussed below.

The channel manager unit (CMU) 805 manages data movement between the main memory 101 and any peripheral devices 104 (e.g. disks and tape drives) which may be coupled to the system. The CMU 805 communicates with external channels through the channel service bus 810 (CSBus). Each CSBus can be coupled to a plurality of external channel adaptors (not shown), each of which is capable of controlling one or more peripheral devices.

The task control unit (TCU) 802 provides overall system control by allocating and deallocating events, maintaining the status of tasks running on the system, performing task priority computations and scheduling the execution of tasks.

D. Memory Interface Unit

1. System Organization

FIG. 2 is a high level block diagram of the memory interface unit (MIU) 102. Each component is discussed below.

Command and address translation (CMAD) 201 handles the buffering and issuing of main memory addresses for store and fetch operations. The CMAD 201 also handles translation between logical and physical addresses, and arbitration of a plurality of requests from the memory 101.

The memory interface unit controller (MIUC) 202 is used to arbitrate and control the interaction of IOM requestors with the MIU. Any IOM requestor may access data in the memory system. The selection of an IOM request from among a number of pending requests is accomplished through a priority scheme implemented by a masking algorithm. The highest priority unit is the TCU followed by the IOU, the DTU and the CMUs. A round-robin approach is used. The MIU looks for the highest priority unit to service, services this unit, and then masks out the serviced unit. The remaining units are then serviced in descending priority. After all units which have pending service requests have been handled, the mask is reset and the servicing of I/O requests repeats starting with the highest priority unit having an outstanding request.

As shown in FIG. 2, four write enable controlled storage logic (WESL) arrays 203, 204, 205, 206 provide the actual data buffer storage for the MIU. While the four WESL arrays are physically identical, WESL array 203 provides additional functionality which allows for individual byte modification. In the exemplary embodiment of the disclosed invention, each WESL array has a 1024 (1K) word data buffer.

Each IOM requestor is assigned a unique and isolated work area within the WESL arrays in order to support main memory operations. The size and location of the work area within the MIU storage area is allocated on a permanent basis from the time that the system is initialized. Thus, there is no dynamic allocation or deallocation of the work area.

2. Write Enable Storage Logic Operation

Figure 3:
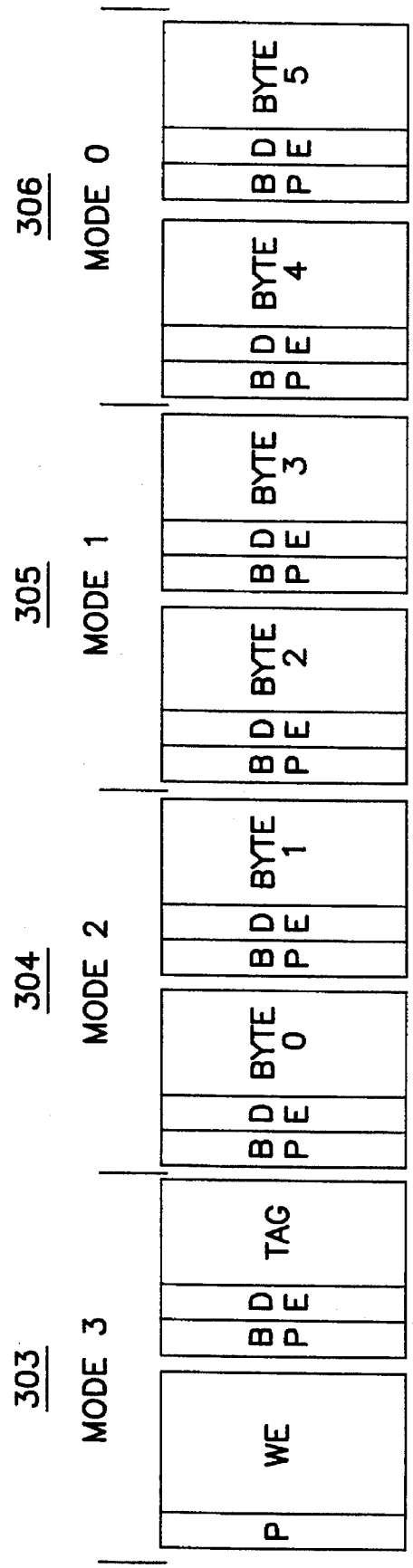
FIG. 3 is a pictorial diagram of the Memory Interface Unit (MIU) data buffer storage layout.

In FIG. 3, the partitioning of data within the four WESL arrays is shown. In modes 0–2 (WESLs 204–206), the actual data is stored. Each of these three modes can store two bytes of each data word for a total of 48 bits. The four bit tag and seven write enable bits are stored in WESL 203 (mode 3). Each chip also has byte parity indications (BP) and data error indications (DE) for the bytes of data that are stored in the particular mode. A word stored in the MIU data buffer may be either from main memory or from an IOM requester. The parity of the incoming word is checked, the parity bit is discarded, and each byte is stored with individual byte parity to facilitate byte modification. When the data is read out of the MIU's data buffer and sent to its destination, the parity on each byte is checked. If the parity of all bytes is correct (i.e., error free), a single system word parity is generated. The word parity is then sent with the data to the destination. If the parity of any byte is not correct, however, the data error flag is distributed for storage with each erroneous byte of a data word in error to preserve error indication after byte modification of the data.

The mode three WESL array 203 provides storage for the write enable bits. The write enable bits are used to perform a "merge" function—a memory write in which only selected bytes are modified. Corresponding to each of the 1024 words in the MIU's buffer is a parallel structure which contains byte-level write enable masks. Each write enable mask consists of seven bits, with six of the seven bits each corresponding to 6 bytes of data in the word. The seventh bit corresponds to the 4 bit tag field. An IOM requester such as a CMU for example, may have 64 words of buffer storage within the MIU and would therefore have control of 64 corresponding WE masks, one mask for each data word.

3. Memory Storage

Main memory modification, which has been requested by IOM requestors, is accomplished by using a fetch vector and a store vector. In the exemplary embodiment of the disclosed invention, as many as 11 IOM requestors may request main memory modification. Thus, each IOM requestor has a corresponding bit within each fetch vector and each store vector. When a requestor attempts to modify data in the memory, a corresponding bit in the fetch vector is set. Data from the memory is then transmitted to the MIU. When the MIU 102 receives the data from the memory (i.e. the data to be replaced), the bit within the fetch vector is reset and the appropriate bit within the store vector is set. The data from the memory is then modified (in accordance with the merge feature-described below) and the modified data is transmitted back to the memory. The store vector is then reset.

Figure 6:
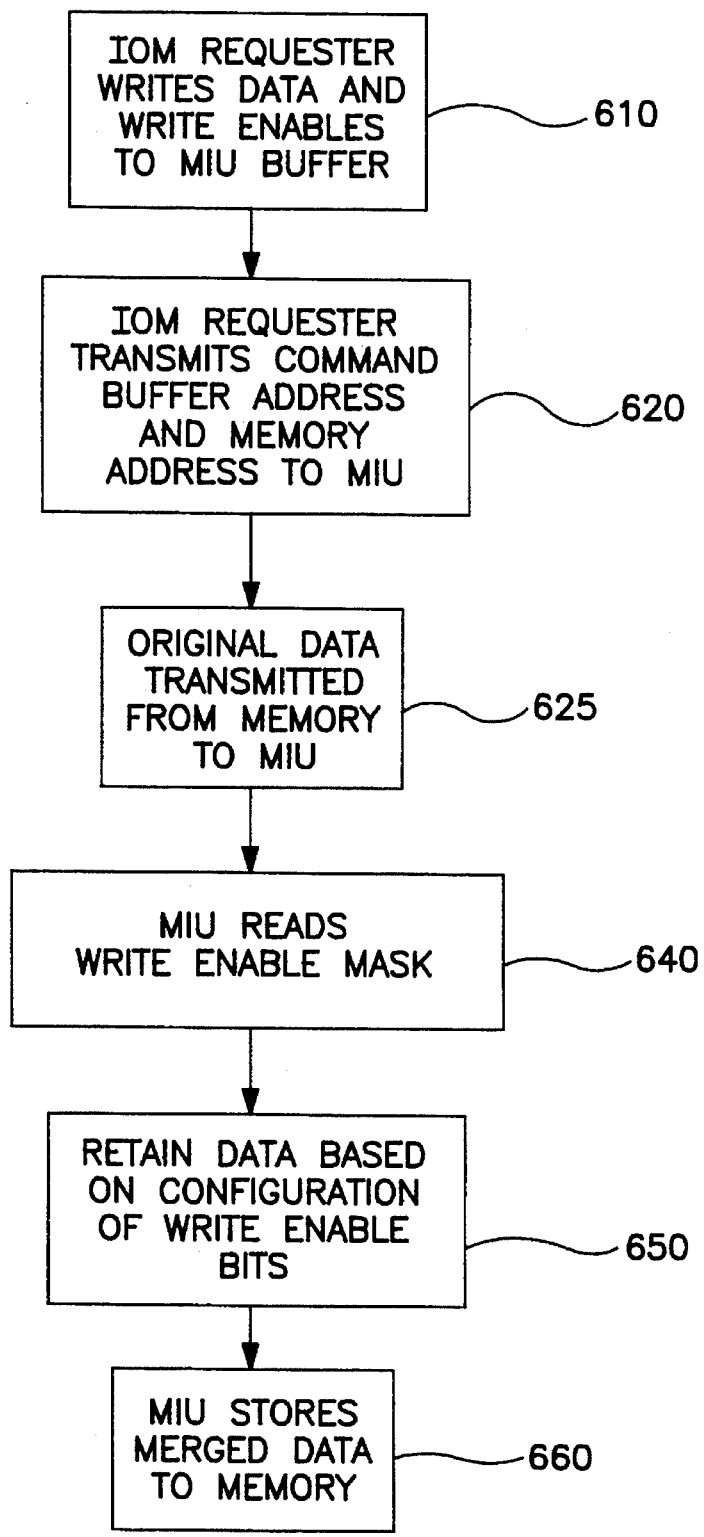
FIG. 6 is a flow chart diagram which illustrates a memory write operation which utilizes a merge function.

A memory write operation, making use of the merge feature, is described with reference to the flow chart diagram of FIG. 6.

For an IOM requestor to transfer data from the IOM requestor to main memory 101, the data and write enables are first written to the buffer area in the MIU which is assigned to the IOM requestor (step 610). The requestor then sends to the MIU 102 the main memory address to which the store is destined and the MIU internal buffer address at which the data to be used for the store operation is located (step 620). Similarly, for a fetch request, the IOM requestor sends the main memory address from which a data page is to be fetched for transfer to the MIU 102 and also the MIU internal buffer address at which data is to be placed.

When the original data arrives at the MIU 102 from the main memory 101 (step 625), the MIU 102 reads out the write enable mask (step 640). For each byte of data within that four-word page, if the corresponding write enable bit is a one, then the data from main memory is retained. If the write enable bit is a zero, then the data provided that already exists in the MIU's internal data buffer is retained (step 650). Once all four words are merged or masked over, as controlled by the write enable bits, then the MIU begins the store operation (step 660).

4. Merge Function

An exemplary embodiment of the merge function is described with reference to FIG. 7. The new data that is to be added to the main memory is shown in the right most column under the heading DATA. Each individual character is four bits wide. Thus, two characters grouped together represent eight bits or one byte. Each line of characters within the data field represents one word. Each word includes six bytes, or 48 bits of data and a four bit tag field for a total of 52 bits. Four words are grouped together in one rectangle to form a page.

The next column (marked WEs) contains the collection of write enable bits (WE). These bits are used in conjunction with the write partial word (WPW) and Store Partial Page (SPP) command to selectively store data to main memory.

The leftmost column (marked OPERATION) contains the instructions issued by the IOM requestor and used by the MIU in performing memory operations.

The following instructions are issued to the MIU by IOM requestors in performing memory operations:

Write Enable (WWE)—This command allows for write enable bits to be modified within WESL mode 3.

Write Full Word (WFW)—This command allows a full word of data to be written into the appropriate memory buffer within the MIU. The configuration of the write enable bits is ignored when this command is used. This command writes the data supplied and automatically forces all of the write enable bits corresponding to that word to zeros. This saves the requestor the extra step of having to explicitly write zeros to the write enable bits.

Write Partial Word (WPW)—This command is identical to Write Full Word (WFW) except that the WE mask corresponding to the data word written is not altered. This command, used in conjunction with Write Write Enables (WWE) prepares MIU buffer pages for actions of Store Partial Page (SPP), described below.

Store Partial Page (SPP)—Unlike the prior commands which control data transfer between the requestor and the MIU, this command is used for data transfer between the MIU and the main memory. When the SPP command is encountered, the requestor supplies an MIU buffer address for the page and a main memory address. The MIU then performs a logical AND operation using the mask defined by the write enable bits and the data and to store the resultant page at the specified main memory address.

Store Full Page (SFP)—This command instructs the MIU to store the entire page to main memory, regardless of write enables.

The commands marked CW (controller word) are commands which instruct the MIU to do main memory operations. The commands that are not marked CW are commands that relate to communications between the MIU and the IOM requestor.

The first two operations (each WWE) set the write enable bits to one for the first two words on that page. Thus, no bit positions in the first two words of this page are modified in main memory when the main memory access finally occurs. The following instructions (WWE, WPW) set write enables required to correctly perform byte modification, and supply (partial) data word to MIU. This results in only some of the bytes located in the third word of data provided by the IOM requestor ultimately being stored in main memory. The final instruction for this page (WFW) sets all the write enable bits for the fourth word to zero. This results in the fourth word of data provided by the IOM requestor ultimately being written to the main memory. The final operation (SPP) causes the page of main memory which is to be altered to be transferred from main memory to the MIU. The bytes of data for which the corresponding write enable bits are set to zero are then modified according to the data in the DATA field. Finally, the modified page is transferred back to main memory.

Figure 7:
FIG. 7 is a pictorial representation of the typical MIU operations for I/O data transfers to memory.
Figure 7:

For the second page shown in FIG. 7, four WFW instructions are issued. This results in all of the write enable bits being set to zero and four word of data from the IOM requestor being written into the MIU. When the SFP instruction is later issued, all of the data in this page is written to main memory. This situation is repeated for the third page.

On the last page shown in this figure, a WFW command is issued as the first command. This results in all the write enable bits being set to zero and the entire word of data being written to this page. The next instructions are WWE and WPW. The WWE instruction sets selected write enable bits to zero and other write enable bits to one. The WPW instruction stores the appropriate data to the MIU. Thus, only selected data within the data field is ultimately written to the main memory. The third and fourth instructions in this final page are WWE instructions. These instructions are used to set the write enable bits corresponding to the third and fourth words to one. The final instruction for this last page (SPP), again causes the page of main memory which is to be altered to be transferred from main memory to the MIU. The bytes of data for which the corresponding write enable bits are set to zero are then modified according to the data in the DATA field. Finally, the modified page is transferred back to main memory.

E. I/O Module Requestors

Figure 9:
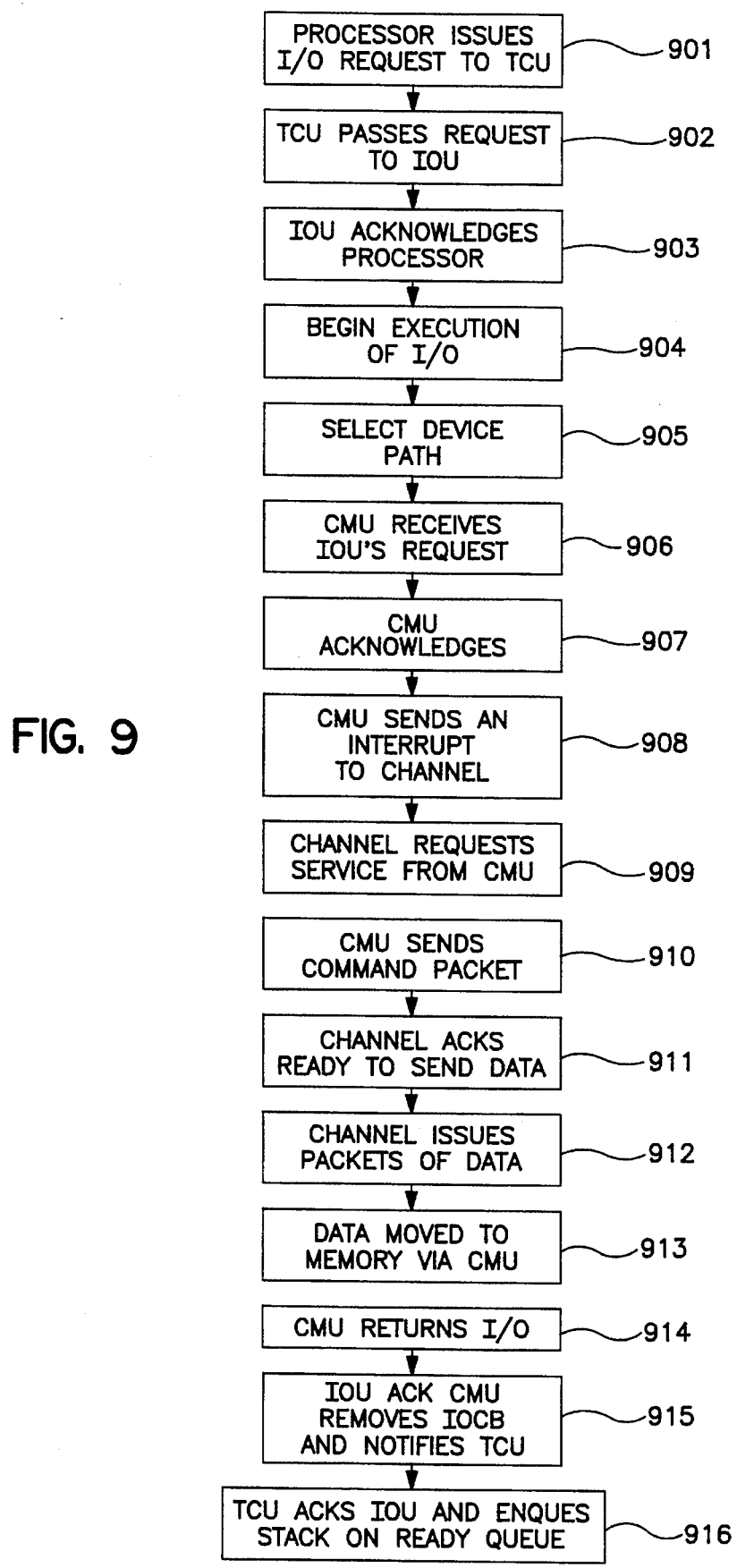
FIG. 9 is a flow chart diagram of the operations performed in a typical disk I/O sequence.

The various IOM requestors are shown in FIG. 8. A detailed discussion of each component follows. In addition, the role of each IOM requestor in a typical disk operation is described with reference to FIG. 9.

The operation of the IOM requestor is explained with reference to the following definitions:

Event—a data structure which can be used for signalling the completion of an I/O operation Event Number—A unique identifier which is associated with an event.

1. Task Control Unit

The TCU 802 monitors the status of all processes within the system. This includes overseeing all tasks and events that are active within the system. Thus the TCU supports task control functions, such as maintaining the status of as many as one-half million events; and implementing a set of functions to be performed on events, including waiting on events, causing events, and resetting events.

In performing these functions, the objective of the task control unit is to keep each processor within the system as busy as possible. Thus, while a processor 105 is running on a stack, it may require additional data, and may issue an I/O operation to the IOM 103 in order to obtain this data. The task then waits for this I/O operation to complete before continuing to execute.

A task which exists on the system is said to be in one of three states:

WAIT state—Processing of the task is suspended while the task is waiting for an event to occur (i.e. an I/O operation to be completed).

READY state—The task has been placed in the ready queue and is waiting for a processor 105 to become available. A task may transition to the READY state as a result of a completed I/O operation.

ALIVE state—The task is currently running in a processor.

The TCU 802 maintains the state of each task, so that the TCU can instruct a processor 105 to begin executing a task which is in the READY state.

In addition, the TCU implements a function which enables a task to change from a WAIT state to a READY state. When the IOU completes an I/O operation for a particular task, the IOU notifies the TCU that the required data is now located in main memory. The TCU associates the completion of the request with the requesting task and then changes the task from the WAIT state to the READY state. When a processor becomes available, the task having the highest priority of all currently READY tasks is assigned to the processor.

The TCU also maintains a priority number for each task so that the processors are assigned to the task in a priority fashion. If an I/O operation is completed for a task with a very high priority causing that task to become READY, the TCU preempts the current task assigned to one of the processors, moving it into the READY state.

The TCU also maintains a plurality of task statistics, including the amount of processor time and the amount of waiting time for each individual task.

The system's priority features are designed so that the TCU assigns each available processor to the highest priority ready task. As tasks change from the WAIT state to the READY state, they are placed in a queue of ready tasks (i.e. the ready queue) which is ordered by priority. When a task performs a wait operation, the TCU goes to the task at the top of the ready queue, knowing that this is the highest priority task, and immediately assigns the task to the newly available processor.

Because tasks frequently run at an identical priority, the TCU provides a limited time slice for each task to be active before it is suspended in favor of another ready task. This is useful in situations in which one task (not performing any waits) runs for a relatively long period of time while another task, situated in the ready queue and of equal priority, can run very quickly. Thus, if a task has been on the processor for it's time slice without entering a wait state, the task will be placed in the ready queue behind tasks of equal priority and the task at the head of the ready queue will be assigned to the processor.

The operating system performs numerous functions in relation to the TCU. These include instructing the TCU to insert a task, to create a task and unblock a task to move the task from a non-scheduled state to a scheduled state. The task is then inserted in the ready queue in proper priority order, and upon reaching the top of this queue, is moved to a processor when one becomes available.

Operation of the task switch algorithm may be more clearly understood through the following two examples.

Figure 10:
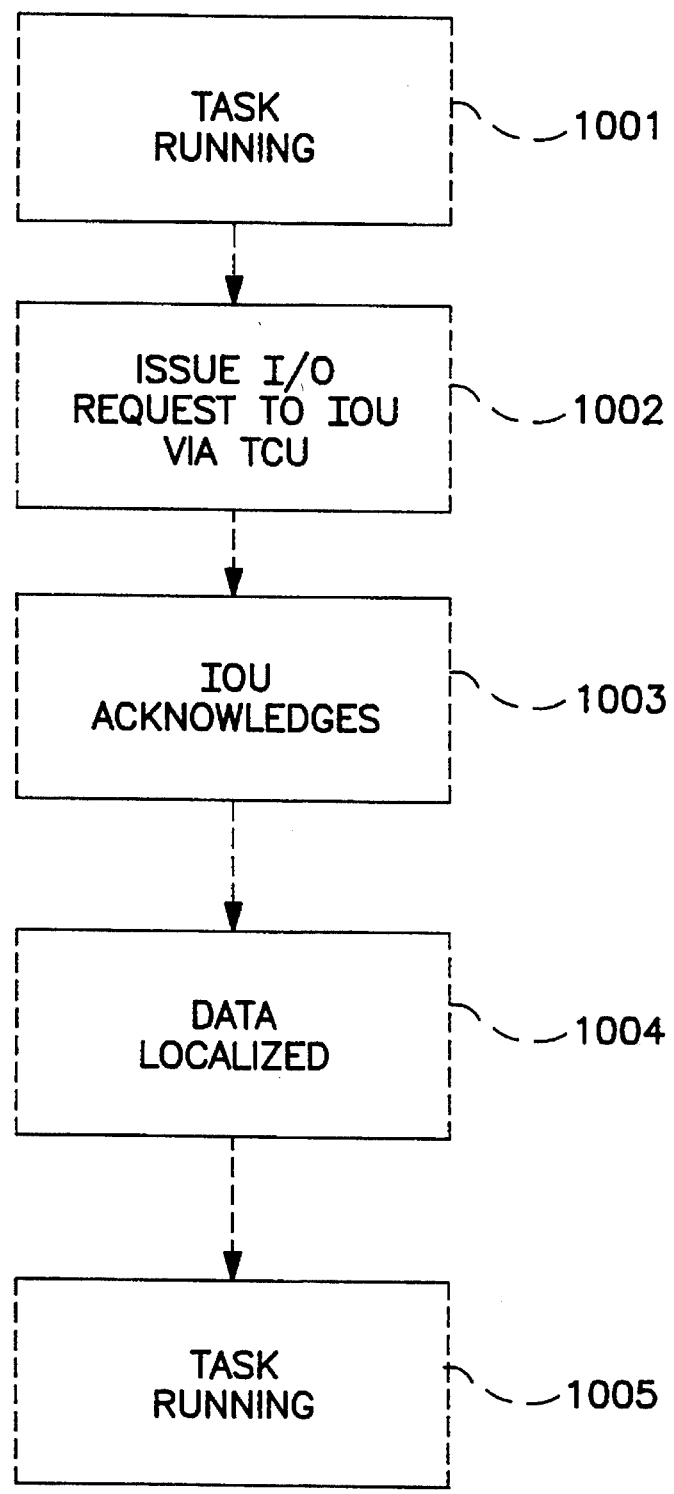
FIGS. 10 and 11 are flow chart diagrams which illustrate operation of the task switch algorithm.

In a first example shown in FIG. 10, the task has been assigned to a processor at step 1001. Half of the program with which the task is associated is in main memory and half is on disk. At some point in time the processor needs the remainder of the program to be in main memory in order to continue the task. The processor issues an I/O request to the IOU (via the TCU) at step 1002 which tells the IOU to localize the remainder of the program in memory. The IOU immediately acknowledges the processor at step 1003, performs the I/O operation, causing the instructions to be brought into memory at step 1004, and completes the operation by causing the event. When the task finally performs a wait operation the processor is instructed to continue running the task as the I/O operation has been completed. Thus, the processor continues to run on the task at step 1005 due to the availability of the program code.

Figure 11:
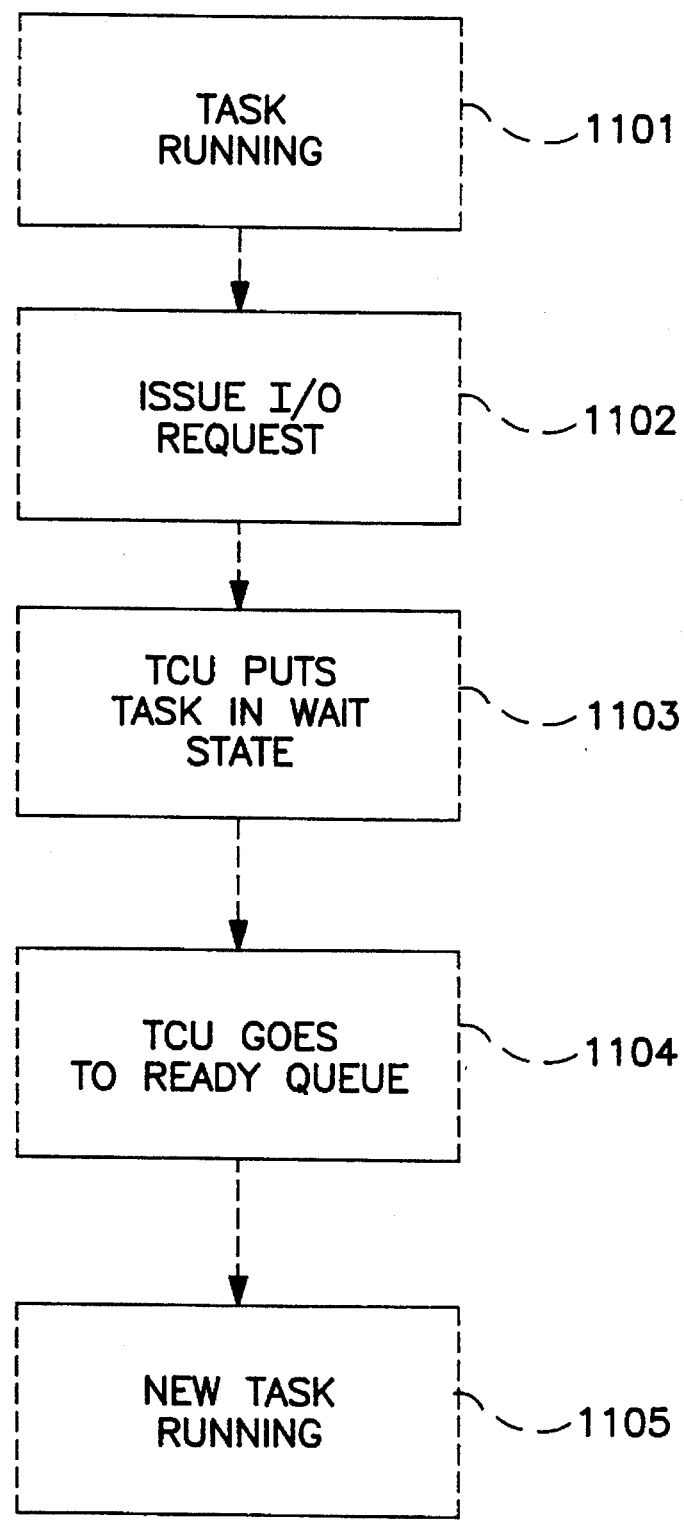

In a second example shown in FIG. 11, the task has been assigned to a processor at step 1101, again with half of the program with which the task is associated in main memory and half of the program on disk. At some point in time, the processor requires that the remainder of the program be brought into main memory. The processor issues an I/O request to the IOU at step 1102 which tells the IOU to localize the remainder of the program in memory. This time, the IOU is not fast enough to complete the operation by the time the code is needed. Thus, the task performs a wait on the particular event associated with the code fetch operation. The task is put in a WAIT mode at step 1103, the TCU goes to its ready queue at step 1104, and the processor begins running on the next task at step 1105.

Figure 12:
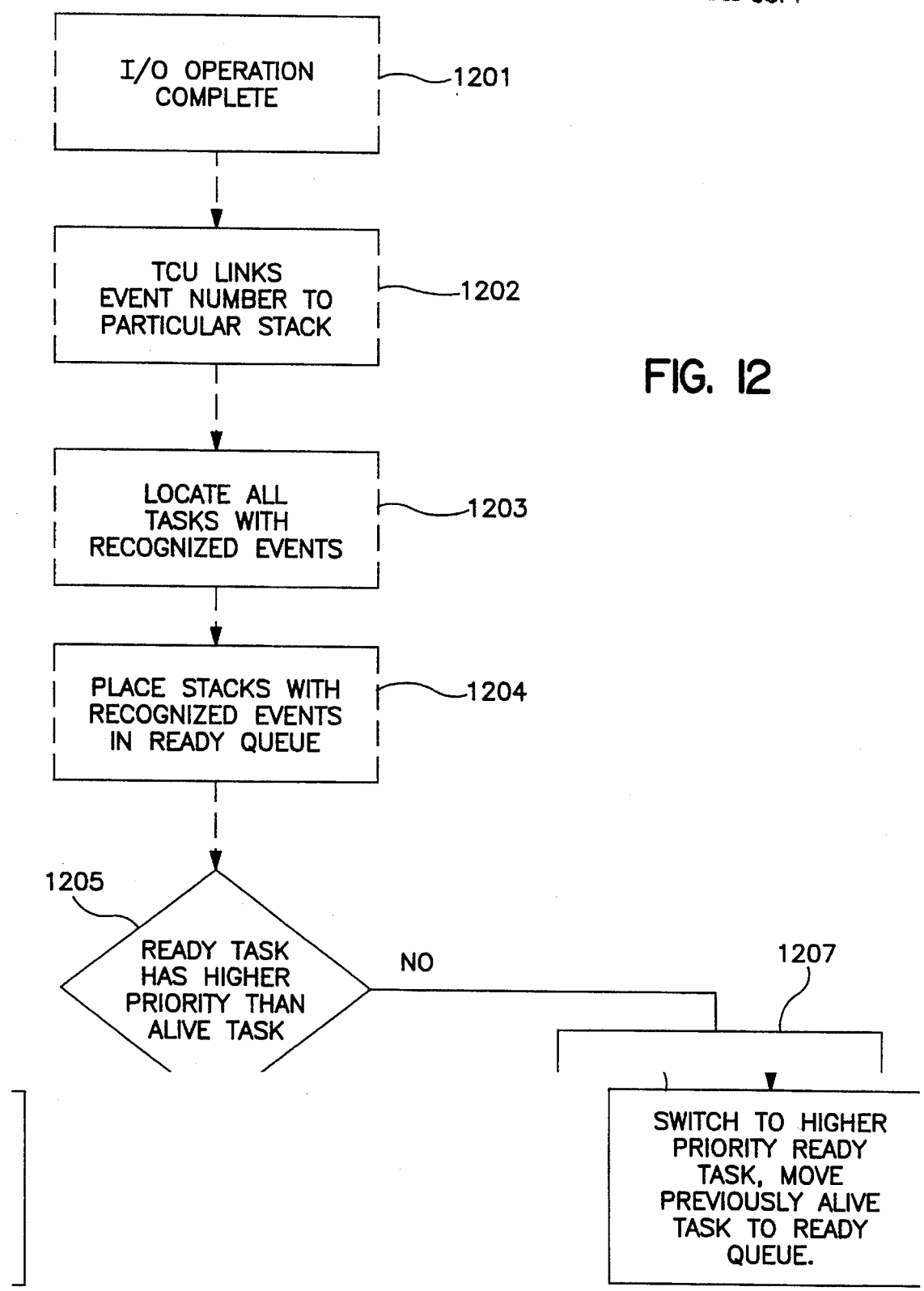
FIG. 12 is a flow chart diagram which illustrates IOM requestor operation upon the conclusion of an I/O Operation.

FIG. 12 illustrates the operation of the IOM requestors upon the conclusion of an I/O operation.

As previously discussed, at the completion of an I/O operation the IOU causes an event (step 1201). When this occurs the event is transitioned to the happened state and all stacks which were waiting on this event are removed from the event's wait queue and are inserted in the ready queue (step 1204). The TCU then compares the priority of ALIVE tasks with READY tasks to determine if a running task should be moved to a READY mode because a task on the ready queue has a higher priority (step 1205). If a READY task has a higher priority than an ALIVE task, then the READY task is marked ALIVE and the previously ALIVE task is placed on the ready queue (step 1206). Otherwise, the ALIVE task continues to run (step 1207).

2. I/O Unit (IOU)

The IOU performs a variety of high level I/O job functions. Operation of the IOU may be understood through the initial stages of FIG. 9, in which a flow chart diagram of the operations performed in a typical disk I/O sequence is shown.

The TCU receives the I/O request message (step 901), transitions the requesting task to the WAIT state, and forwards the request to the IOU (step 902). The IOU acknowledges the processor (step 903).

An I/O request message that is received by the TCU 802 is typically accompanied by an associated I/O Control Block (IOCB). The IOCB is a small block of information in main memory that contains all of the pertinent information for completing that I/O operation. This information includes the status of the I/O operation, the type of I/O operation, time-out criteria, error reporting information, buffer addresses, event number etc. When the IOU 803 receives the request for the I/O, the IOU 803 also receives a reference to an IOCB. The IOU 803 retrieves the IOCB from main memory 101 and checks the IOCB to ensure that certain requirements are satisfied. In the exemplary embodiment of the invention, these checks include: that the format and contents indicate a valid I/O operation is requested; that the device referenced by this I/O is in the proper state (i.e. a state in which it can receive I/O requests); and that the device is present in the system.

If these requirements are met, then the IOCB is linked into the IOU Active Queue. This queue includes all active I/O operations for which the IOU 803 is responsible. The I/O operation begins execution (step 904) and the IOU 803 executes a variety of algorithms to select a proper job path for performing the I/O operation (step 905). The remainder of the flow-chart diagram of FIG. 9 concerns the operation of the CMU 805 and is described below in reference to that unit.

The IOU 803 also determines whether the I/O operation requires a specific device (i.e. disk drive, tape unit, printer, etc.) and then selects an appropriate path. For resiliency purposes, such as hardware malfunctions, several paths are generally available for communicating with any specific device. As set forth below, the IOU 803 is able to determine when a path to a device has been lost.

Once a path is selected by the IOU, the IOU schedules an I/O operation by linking the IOCB into the queue which corresponds to the controller for that bus. Depending on the attributes of the I/O operation, that queue may be accessed by a CMU 805 or a DTU 804, as described below. If accessed by a CMU (e.g. for a disk read) the IOU 803 receives a message requesting the I/O operation. Such an I/O operation may be, for example, a request that a block of information from a specific device be written into main memory. The IOU 803 selects a channel (not shown) (also referred to as a bus or a port) and a controller (not shown) to communicate with the specific device and to link the device into the corresponding queue. An interrupted message is then sent to that CMU 805 saying that there is a queue containing an I/O operation for that CMU to act upon.

The IOU 803 has several mechanisms for determining that a device path has been lost. For example, the IOU 803 can detect that an I/O operation has not been completed. When an I/O operation is issued, a time duration in which the I/O operation is to be completed is stored within the IOCB. In addition, upon giving the I/O operation to the correct device, the IOU 803 makes an entry in a time table indicating that an I/O operation is to complete within a predetermined period of time. Under most circumstances, that I/O operation will complete successfully. However, if the predetermined period elapses and the I/O operation has not been completed, the IOU 803 returns a message indicating that the I/O operation has timed out. The IOU 803 also gives the bus responsible for the I/O operation an opportunity to clear. If the bus (and consequently the selected I/O controller) does not clear its information within a predetermined period, the IOU 803 changes the state of that bus to dead, and notifies the remainder of the system that the bus is dead. It is the responsibility of other sections of the system to attempt to revive the bus.

In addition to keeping track of I/O operations that are active in the I/O subsystem, the IOU 803 also keeps track of all devices that are present. To this end, the IOU 803 has a data structure which contains information on all I/O devices, i.e. buses, controllers, and the units serviced by the various controllers that are in the partition that the IOU is responsible for. The IOU 803 has a device table which (depending on whether it is a DTU, a bus, or controller unit) has specifically formatted information to keep track of each of these device types.

Part of the responsibility of an IOU include keeping track of devices which are on the system. If a bus has not been used for an I/O operation in the recent past, the IOU frequently exercises each bus to ensure that each bus is operating properly.

Although the IOU 803 is responsible for keeping track of timed I/O operations, some I/O operations are not timed. These occur less frequently than timed operations, but they do occur. Some untimed I/O operations relate to test operations, and for example, may wait for a device to become active. Other untimed I/O operations wait for a device to become ready and may sit in the I/O system for days.

The IOU 803 is also responsible for gathering job statistics on the action of devices. When an I/O request is issued, the IOU keeps track of the amount of time for the I/O to complete. When the results of an I/O operation are returned, the IOU 803 updates a buffer which contains statistics for those jobs and those devices involved in the I/O operation (i.e. for billing and monitoring).

If the I/O operation completes without error, the IOU 803 sends the TCU a message which causes an event associated with the operation to occur. Thus, the IOU 803 notifies the TCU 802 that the I/O operation for which the task was waiting has completed. This causes the TCU 802 to change the task that was waiting for the I/O operation from WAIT mode to READY mode, as described above.

3. Channel Manager Unit (CMU)

The CMU 805 is the one I/O requestor that has direct communication paths with both the MIU and the channels. Operation of the CMU is shown with reference to FIG. 9.

The CMU receives and temporarily stores an I/O request generated by the IOU 803 (step 906). The CMU 805 acknowledges the I/O request (step 907) and notifies the channel that the CMU 805 has a task for the channel to perform. This is called a host service request (HSR).

At some time later, the channel issues an adapter service request (ASR) indicating that it is ready to perform the task.

Once notified of a request, the channel will drive an I/O through three phases (command, data, and result) by utilizing a sequence of the following operations:

Control Out—used by the channel to request command or control information from the manager;

Status In—used to send status information to the CMU; and

Data In—used to send data from the channel to the CMU; and

Data Out—used to send data to the channel from the CMU.

When the CMU 805 receives the I/O request, it interrupts the indicated channel (step 908). Some time later, the channel Oat sent the ASR requests service from the CMU 805 (step 909), at which time the CMU 805 sends a formatted command packet for the I/O operation to the channel (step 910). The command packet includes information on which disk device this I/O operation may need to use, the address on the disk where this data may be found, and the amount of data to be provided. The channel then performs similar operations for the controllers that it services, passing information down the chain until it reaches the device which contains the requested data. Through the use of a status packet, the channel may set up and synchronize the CMU channel. This packet informs the CMU that the channel is ready to send data (step 911). Once the CMU 805 and the channel are in sequence (i.e. are synchronized for this I/O operation), the channel issues packets of data (step 912). Data is then moved from the channel to the memory via the CMU 805 (step 913). The CMU 805 uses information contained in the IOCB to determine the location in main memory into which the data is to be placed. The channel provides the data to the CMU and the CMU 805, in turn, writes the data into main memory (step 914) through the MIU 102, as described above.

Data-in requests are performed for as many packets as are required for the total I/O operation. Data is not sent in one long stream, but rather is divided into packets for error checking and to improve performance. Likewise, if the I/O request requires that data be written from memory to a device (tape, disk, printer), the channel issues a data-out request indicating that the device is ready to receive data.

The CMU 805 uses information contained in the IOCB which indicates an area in memory containing the data to be read. The information and data are then transmitted by the CMU 805 to the channel using multiple data packets. This continues as long as necessary to get the I/O operation through the data phase. Once the data length request is satisfied for an I/O operation, the channel enters the result phase. This includes the step of checking for errors and formatting a packet containing result information (i.e. an indication that all the data has been transferred, that all of the data has not been transferred, or that an error has occurred, etc.). Upon accumulating error information, the channel issues the result of this I/O operation to the CMU 805. The CMU processes the result supplied by the channel and returns the I/O to the IOU. This completes the role that the CMU 805 and the channel play in an I/O operation.

The CMU 805 returns the I/O operation to the IOU 803 through a queue in much the same way that the IOU 803 transfers the I/O operation to the CMU 805 (step 914). Similarly, the CMU 805 sends a message back to the IOU 803 to finish this sequence in the same way that the IOU 803 sends a message to the CMU 805 to start this sequence. Results are placed in a result queue and a message is issued to the IOU indicating that there is a non-empty queue which requires service. The CMU links the completed IOCB in the result queue and notifies the IOU via a message.

The IOU 803 acknowledges the message from the CMU 805 (step 915), and removes the IOCB from the result queue. If the IOCB has completed without error, then the IOU signals the TCU to change the task state of the waiting task, as indicated by the event in the IOCB, READY state. The TCU performs this operation (step 916). This completes the typical I/O sequence.

In addition to handling I/O requests, the CMU 505 also maintains information on all devices to which it is connected. The CMU 805 contains information which relates to the channels (or the buses) that the CMU services, which are coupled to the channel service bus. The CMU 805 is also capable of bringing channels into the system by dynamically downloading microcode into a channel.

When a channel detects an error, it may or may not be associated with IOCB. If it is associated with an IOCB, the channel can, as part of the result phase, include error information for the corresponding I/O operation. If the channel detects an error that cannot be associated directly with an IOCB, the channel issues an error status packet. On behalf of that channel, the CMU sends a formatted error packet to the IOU 803. The IOU receives error packets from all CMUs and CMUs receive error packets from all channels.

4. Data Transfer Unit

When the IOU receives an I/O request by a standard IOCB and message interface, before the IOU 503 passes the request on to a CMU 805 to get the data from a disk, it first checks the table (not shown) supporting and controlling a disk cache memory area. This is done to determine if any or all of the information required for this I/O operation is already present in memory. If the disk cache portion of memory does not contain any of the data which the processor is requesting, the I/O operation is passed to the CMU 805 which gets all of the data through the channel from disk and places this data in main memory. If, however, some or all of the information is present in the disk cache portion of memory, then the data transfer unit (DTU) 804, as opposed to the CMU 805, moves the data to the user buffer portion of memory.

The DTU 804 appears to the IOU as a bus or channel. It checks in to the IOU in the same manner as a bus (or channel) and it is issued I/O operation through a queue structure as a bus (or channel).

The IOU 803 can identify the portions of an I/O operation having data which is in the disk cache. A user typically requests a sequential block of information from a disk. Depending on the amount of data that is required (from word 0 to word n), the data actually contained on the disk will fall within one or more tracks on the disk. A caching algorithm implemented in the I/O (sub)system caches the complete track which was last accessed by the controller. If a user I/O operation is the first I/O request issued when the system comes up then the cache is empty. An exemplary user I/O operation from word 0 to word n may start somewhere in the middle of track X. It may encompass a portion of track X, the entire track (X+ 1) and a portion of track (X+2). If none of these tracks is present in the cache, then after the I/O operation, the data in the last track that was accessed (X+2) will be in the disk cache.

In order to cache the last track, the CMU moves what is required of track X and all of track (X+1) directly to the user buffer, then moves the entire track (X+2) to the disk cache.

In an exemplary I/O operation, assume that six packets are required to move an entire track, but that the data required by the user is satisfied somewhere in the forth packet. At the end of every packet transfer, the CMU checks to see if enough packets have been transferred to satisfy the user. At the end of the forth packet, the CMU 505 sends a signal to the IOU 503 indicating that enough of the track is in the cache to satisfy the user I/O. At that point, the IOU 503 sends an IOCB type formatted command block to the DTU 504 requesting that the DTU 804 move a portion of track (X+2) to the user buffer that will satisfy the I/O. This memory-to-memory transfer completes the responsibilities of the DTU 804.

F. Error Handling

1. Overview

Figure 13:
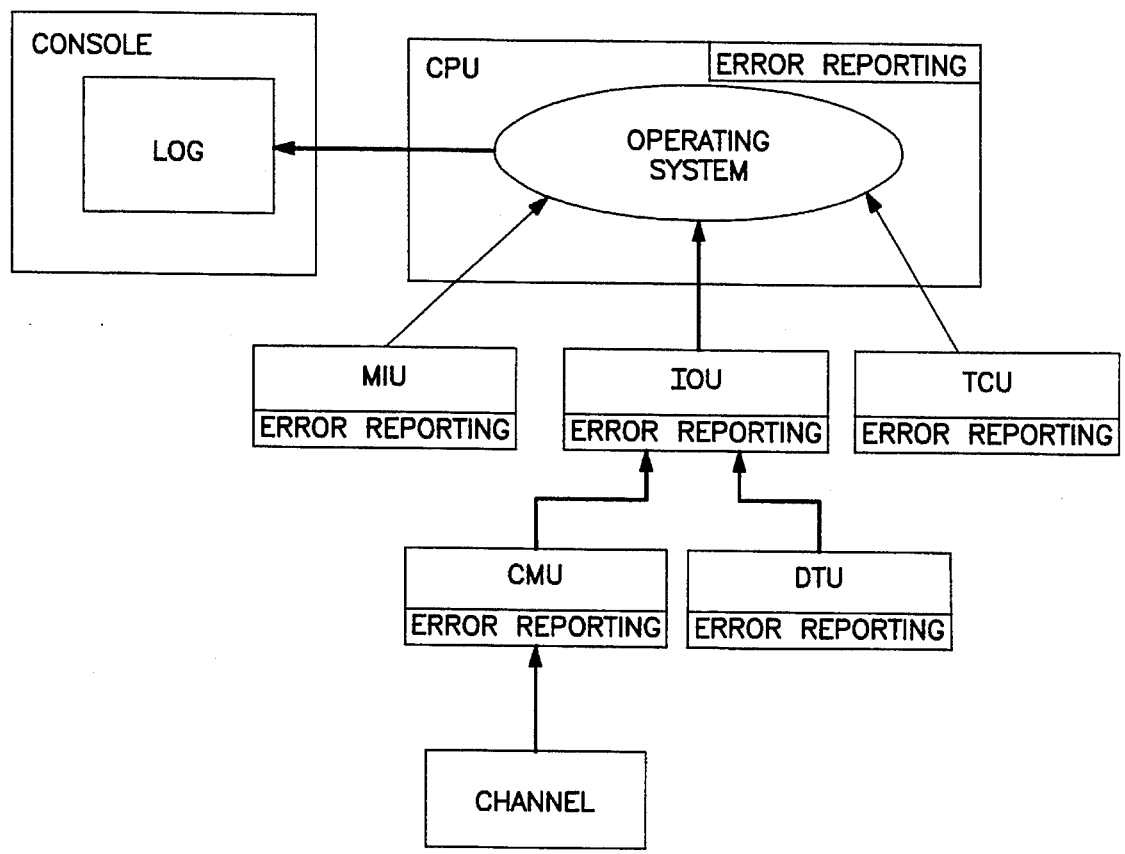
FIG. 13 is a pictorial diagram of the hierarchical error reporting scheme.

The I/O Module also has facilities for error handling. For improved error handling capability, the hardware is designed to enable various operating system procedures to be invoked directly. Thus, the operating system is not used to determine which procedure is to be called in the event of an error. In accordance with this scheme, a two tier hierarchical error logging scheme has been developed, in which the operating system handles errors generated by the MIU, TCU, and IOU. The MIU, TCU, and IOU will, whenever possible, report errors directly to the operating system over the system interface. The CMU and DTU report errors to the IOU, which uses its interface with the operating system to log such failures. This is shown with reference to FIG. 13.

An audit trail, i.e. a trace of previously detected unit errors, is kept locally within each IOCT. Thus, in the event that the system cannot be initialized, a maintenance console 820 coupled to the I/O system can display the failure information directly for debugging purposes. Furthermore, audit trails can be logged and cleared by the console during the system initialization sequence, so that errors which cause a malfunction of the normal logging mechanism are also entered into the log.

When a channel 830 detects an error, it sends an error status packet to the CMU 805 via the channel service bus. The CMU 805 receives the error information and attempts to forward it to the IOU 803. The IOU accepts the error information and initiates the appropriate operating system procedure by sending the appropriate command to the TCU 802. The TCU then instructs an appropriate central processor 805 to begin execution of a predetermined error handling procedure. When not being executed, this error handling procedure resides in a sleeping state. Upon being woken, this procedure asks the IOU 803 for all of the error information, logs the error information upon receipt and returns to a sleeping state when completed.

2. IOU and TCU Error Reporting

IOU and TCU errors are reported, whenever possible, directly through the system interface via event and message mechanisms.

Non-fatal IOU errors that may be associated with an IOCB are reported to the operating system via that IOCB. An entry for the error is also made in the audit trail for the IOU 803. An example of this type of error would be an invalid device state occurring while handling the initiation or completion of an I/O operation requested using an IOCB. In response to this error, a twenty-four bit IOU error information field is added to a fixed area of the IOCB, and an error identification code is written into this field and into the corresponding audit trail entry. The IOU then executes normal I/O finish algorithms and returns to idle.

Non-fatal errors that may not be associated with an IOCB are reported directly to the operating system via the system interface. An example of this type of error would be the receipt of a bad message, or the receipt of a bad IOCB from the CMU or DTU. Early in the initialization process, the operating system sets up hardware error logging tasks which wait on error events. The error events are installed in the IOU 803 and the TCU 802. On the detection of a non-fatal error not associated with an IOCB, the unit detecting the error queues the error information locally, and causes the error event, thus awakening the error handling task. This task then notifies the unit to transmit error entries, one at a time, until the error queue is empty. After entering such an error into the internal error queue and causing the error event, the reporting IOCT makes a local audit trail entry and returns to idle. Each error queue entry and its corresponding audit trail entry have the same unique twenty-four bit error identification code as described previously.

The IOU 803 and TCU 802 are subject to two distinct types of error conditions which cause these units to record error information locally and halt. The first type of fatal error occurs when a serious hardware malfunction is detected. Such errors generally occur in the states of the flip-flops within the IOCT and cannot be reliably reported through the system interface. Upon detecting a fatal error, the IOCT halts with the error flip-flops set. These flip-flops are always displayed and may be cleared at the system console as part of the logging of the audit trail during the subsequent system initialization sequence.

The second type of fatal error occurs when an IOCT can no longer communicate with main memory to perform fetch, store, or send message operations. In this case, the IOCT makes an audit trail entry indicating the problem, and halts. The audit trail entry is logged and may be cleared at the console the next time that the system is initialized. Since the IOU 803 and TCU 802 do not time out their message interface (in order to support functions such as console communication), a fatal error in an IOU or TCU is likely to cause the processor(s) 105 to hang waiting for a response message from the IOU or TCU. Therefore, the IOU and the TCU, upon detection of a fatal error, log the information to the console.

The console, upon being notified, pauses the system, logs the failed unit's fatal error flip-flops, audit trail and unreported error queue, and decides between two options. First, it may decide to attempt to resurrect the failed unit by executing a special program which examines the state of the unit, and, if possible, restores it to normal operation. The second option available to the console upon detection of the loss of an IOU or TCU is to declare the unit unusable, and remove it from the system.

The unit is removed from the system by the execution of another special program which will attempt to copy all of the pertinent information from the failed unit to a redundant unit (if it exists) such that the system can run using the redundant unit only. System operation will continue, if the macro reports a successful completion. In any case detailed error information is logged at the console. The console then attempts to continue system operation.

3. CMU and DTU Error Reporting

The CMU 805 and DTU 804 report errors directly to the operating system via IOCB's whenever possible. Errors that cannot be associated with an IOCB, are reported to the operating system by way of the IOU error queue mechanism.

Non-fatal CMU and DTU errors that can be associated with an IOCB are reported in that IOCB. An example of this type of error would be a CSBus parity error. To report this error, an entry is first made in the audit trail. A twenty-four bit CMU/DTU error identification code is added to the fixed area of the IOCB, and the same error identification code is recorded in the IOCB and the associated audit trail entry. The unit executes normal termination algorithms and returns to an idle state.

Non-fatal CMU and DTU errors that cannot be associated with an IOCB are reported via a message to the IOU 803. Examples of this type of error would be the receipt of a bad status packet from the CSBus or the receipt of a bad message. The IOU 803, using the error event interface to the operating system (not shown), sends the error information to the log. An entry is also made to the audit trail. The same error identification code is recorded in the error queue entry and the audit trail. The unit attempts to leave the affected data structures in a good state and returns to idle.

Fatal CMU-DTU errors cause the IOCT to save the current state in a manner that can be scanned by the console and then to halt. The IOU 803 detects, through its CMU/DTU monitoring function, that the unit has stopped processing and reports this to the operating system through an interface (not shown) between the operating system and the IOU 803. This interface is known as the bus death event interface. The IOU 803 also disables the defective IOCT from the MIU. The operating system may either attempt to restart or remove the failing IOCT. The operating system attempts to restart the IOCT by making a request to the IOU 803 (since a broken unit may not be able to send an acknowledge), which forwards the request to the appropriate IOCT. The request is ignored if the stop-on-error switch is on. If the switch is off, then the error information is read from the surface state of the IOCT and sent to the IOU via a message and also entered in the audit trail. The IOCT clears itself out, and goes idle. If the restart fails, or if the operating system initially decides to remove the failed IOCT from the system, a request to the console is made. In response to a request of this type, the console creates log entries from the error flip-flops, the unreported error queue, and the audit trail, and disables the IOM requestor from the system.

4. MIU Error Reporting

MIU error reporting is treated separately because it does not have a general processing capability. MIU fatal error detection includes the detection of control store parity errors. The MIU 102 also detects many non-fatal error conditions. Some of these conditions, which are (indirectly) reported to the IOM requestors, may eventually cause a system fatal error. For example, a system fatal error may be caused by lost originals, i.e. a situation where the (IOM) requestor stores data in the MIU for purposes of accomplishing a main memory store, the MIU fetches original data from main memory to gain ownership of the data to be modified by the store and an error occurs between the memory and the IOM, so that the MIU can no longer determine the source of the previously fetched data. Many MIU detected errors cause the setting of the data error bit associated with a data word. This bit may be set, for example, in conjunction with the notification of the internal requestor.

The MIU 102 maintains three registers (not shown) to support non-fatal error reporting. The first is the error register, which dynamically accumulates specific failure information. When any error is detected, the associated bit in this register is set. The second register is the error number register, used to tag each error for duplicate report identification. The error number register is a two bit counter, which is incremented upon each failure report. The third register is the audit trail register, which in format is the same as the error register. It is used to record the most recent failure for which reporting to the log was attempted. MIU detected non-fatal errors include: data parity error on a word which is brought into the MIU from main memory (causing the data error bit to be set), control parity error on the first word of a four word group (causing the page of data or message to be lost and possibly an original to be lost from the system), and IBUS write control parity error (the requestor is notified directly that the request was lost). Non-fatal errors are loaded into the error register within the MIU 102. Periodically, the operating system, via the IOU, issues a read-and-clear-error-register operation directed to the MIU 102. The MIU 102 sends the current contents of its error register, as well as the error number register, back to the requesting processor 105 in its acknowledge message. This clears the error register, increments the error number register, and moves the previous contents of the error register into the audit trail register.

On each halt load (stopping and reinitializing the machine), if an error has occurred, the console enters the audit trail register, also tagged with the error number register, and the error register, tagged with the error number register, into the log. The operating system does not poll the error register unless the result of the previous poll has been written into the log. If the last error number before the halt load is the same as the number associated with audit trail register, then the audit trail register is a duplicate; otherwise, it is a unique report.

Fatal MIU errors, including a control store parity error, cause the MIU 102 to stop processing memory requests. The operating system is most likely powerless to recover in this situation since the processor(s) will probably hang on a request to poll the fail register in the MIU. Thus, for this type of error, the MIU merely sends the fatal error indication to the console. Upon detecting the MIU fatal error signal, the console pauses the system, and logs the fatal error, the error register, and the audit trail. It then either restarts the MIU 102 or removes that entire IOM coupled to the MIU from the system. If an MIU restart is required, then the console executes a designer supplied procedure which examines the MIU state and attempts to correct it so that the system can be continued. If this procedure returns a failure to the console, or if the console initially decides to remove the MIU from the system, then the console takes the appropriate steps to disable this board from the system, and possibly to swap the TCU 802 and IOU 803 if they were the cause of the unusable MIU. If it is possible, the console then restarts the system.

While the invention has been described in terms of an exemplary embodiment, it is contemplated that it may be practiced as outlined above with modifications within the spirit and scope of the appended claims.

What is claimed:

1. An input/output (I/O) system including a plurality of processors, a plurality of I/O devices and a memory, said memory including a plurality of memory buffers, wherein said I/O system performs a) data transfer between said plurality of I/O devices and the memory, b) data transfer within the memory and c) task scheduling and I/O requests handling for I/O operations executed on said plurality of I/O devices, said I/O system comprising:

memory interface means a): for transferring a continuous block of a plurality of data values between the memory and the I/O system; and b): responsive to a control signal for i) receiving said continuous block of said plurality of data values from said memory beginning at a starting address in said memory, ii) modifying only selected data values of said continuous block of said plurality of data values received from said memory to create a continuous block of a further plurality of data values, and iii) replacing, beginning at said starting address, said continuous block of said plurality of data values in said memory with said continuous block of said further plurality of data values;

I/O unit (IOU) means for queuing said I/O requests for said I/O operations as said I/O requests are received, selecting one of a plurality of paths within said I/O system for each of said I/O operations, collecting statistics on operation of said plurality of I/O devices and maintaining a list of said plurality of I/O devices;

data transfer unit (DTU) means for moving data among said plurality of memory buffers responsive to commands from said I/O unit means;

task control unit (TCU) means for maintaining the status of tasks on the system and for signalling each one of said plurality of processors to execute a respective one of said tasks which is in an executable state; and channel manager unit (CMU) means for receiving data from channels associated with said plurality of I/O devices and for transferring said data to said memory interface means.

2. The system of claim 1, wherein said system is implemented on a single circuit board.

3. The system of claim 1, further coupled to a plurality of peripheral devices and further including a plurality of channel manager unit means coupled to the memory interface means for managing a plurality of data transfers between the memory and the plurality of peripheral devices.

4. The system of claim 1, further including a bus which connects the memory interface means with the I/O unit means, the data transfer unit means, the task control unit means and the channel manager unit means.

5. The system of claim 1, wherein the memory interface means is implemented with emitter coupled logic circuitry.

6. The system of claim 5 wherein the I/O unit means, the data transfer unit means, the task control unit means and the channel manager unit means are implemented with complimentary metal oxide semiconductor circuitry.

7. The system of claim 1 wherein said TCU means includes:

ready means for indicating the status of tasks running on the system wherein said ready means includes means for indicating that a task may be run on said system;

alive means for indicating the status of tasks running on the system wherein said alive means includes means for indicating that a task is running on said system; and wait means for indicating the status of tasks running on the system wherein said wait means includes means for indicating that a task is currently unable to be executed on said system.

8. The system of claim 1 further including maintenance console means for recording error information and further including error handling means for reporting error information to said maintenance console means from said IOU means, said CMU means, said DTU means, said TCU means and said memory interface means, said error handling means comprising:

CPU reporting means for transferring error information from said CPU to said console;

IOU reporting means, coupled to said CPU reporting means for transferring error information between said IOU and said CPU;

CMU reporting means, coupled to said IOU reporting means for transferring error information between said CMU and said IOU;

DTU reporting means, coupled to said IOU reporting means for transferring error information between said DTU and said IOU;

memory interface reporting means, coupled to said CPU reporting means for transferring error information between said memory interface means and said CPU; and TCU reporting means, coupled to said CPU reporting means for transferring error information between said TCU and said CPU.

9. The system of claim 1 further comprising:

maintenance console means for recording error information; and error handling means for transferring error information from at least one of said IOU means, said DTU means, said TCU means, said CMU means, and said memory interface means to said maintenance console means.

10. The system of claim 1, wherein said DTU means performs block data transfers between one of said plurality of memory buffers and another one of said plurality of memory buffers.

11. The system of claim 1, wherein said I/O unit means, said data transfer unit means, said task control unit means and said channel manager unit means are each implemented in a substantially similar computer circuit.

12. A memory interface unit for transferring a plurality of data values from each of a plurality of input/output module (IOM) requestors to a memory unit, wherein said memory unit includes a continuous block of a plurality of original data values, said memory interface unit comprising:

a plurality of IOM requestors workspaces, each corresponding to a respective one of said plurality of IOM requestors;

means for transferring a plurality of data values from one of said plurality of IOM requestors to the respective one of said IOM requestor workspaces;

means for transferring memory modification information from said one of said plurality of IOM requestors to the respective one of said IOM requestor workspaces;

means for transferring a memory unit address from said one of said plurality of IOM requestors to the respective one of said IOM requestor workspaces, wherein said memory unit address is a starting address of said continuous block of said plurality of original data values in said memory unit;

means for transferring said continuous block of said plurality of original data values from said memory unit to said memory interface unit beginning at said memory unit address;

modification means, responsive to said memory modification information, for modifying only selected data values of said continuous block of said plurality of original data values which have been
a) received from said memory unit, and
b) identified by said memory modification information,
with respective ones of said plurality of data values from said one of said plurality of IOM requestors to form a continuous block of a further plurality of data values; and means for replacing, beginning at said memory unit address, said continuous block of said plurality of original data values in said memory unit with said continuous block of said further plurality of data values.

13. The memory interface unit of claim 12, wherein said memory unit address is a logical address, further comprising:

command memory addressing (CMAD) means including means for receiving said memory unit address and for transmitting a further memory unit address to said memory unit wherein said further memory unit address is a physical address corresponding to said logical address and means for translating said logical address to said physical address;

memory interface unit controller means for selecting said IOM requestor from said plurality of IOM requestors; and write enable store logic means for storing said data values and said memory modification information.

14. The memory interface unit of claim 12, wherein said memory interface unit implements a purgeless cache protocol and said memory interface unit does not include a cache memory.

15. The memory interface unit of claim 12, further comprising:

write enable means for transferring memory modification information from said one of said plurality of IOM requestors to said write enable storage logic means;

write full word means for transferring said plurality of original data values from said one of said plurality of IOM requestors to said corresponding IOM requestor workspace and for altering said memory modification information; and write partial word means for transferring said plurality of original data values from said one of said plurality of IOM requestors to said corresponding IOM requestor workspace.

16. A memory interface unit according to claim 12, wherein said modification means modifies selected ones of said plurality of original data values beginning at least one byte removed from a closest word boundary of said memory unit.

* * * * *